United States Patent
Gohite et al.

(10) Patent No.: US 10,039,048 B2
(45) Date of Patent: *Jul. 31, 2018

(54) PROTECTION AGAINST FADING IN A NETWORK RING

(71) Applicant: CISCO TECHNOLOGY, INC., San Jose, CA (US)

(72) Inventors: Pravin K. Gohite, Boxborough, MA (US); Samer Salam, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 15/178,322

(22) Filed: Jun. 9, 2016

(65) Prior Publication Data

US 2016/0286462 A1    Sep. 29, 2016

Related U.S. Application Data

(63) Continuation of application No. 13/903,767, filed on May 28, 2013, now Pat. No. 9,392,526.

(51) Int. Cl.
*H04W 40/34* (2009.01)
*H04W 40/12* (2009.01)
*H04L 12/729* (2013.01)
*H04L 12/707* (2013.01)

(52) U.S. Cl.
CPC .......... *H04W 40/34* (2013.01); *H04L 45/125* (2013.01); *H04L 45/22* (2013.01); *H04W 40/12* (2013.01)

(58) Field of Classification Search
CPC .... H04W 40/34; H04W 40/12; H04L 45/125; H04L 45/22

See application file for complete search history.

(56) References Cited

U.S. PATENT DOCUMENTS

| | | | |
|---|---|---|---|
| 5,953,312 A | 9/1999 | Crawley et al. |
| 6,574,280 B1 | 6/2003 | Liau et al. |
| 6,697,334 B1 | 2/2004 | Klincewicz |
| 7,558,205 B1 | 7/2009 | Moncada-Elias et al. |
| 9,161,259 B2 | 10/2015 | Bhandari et al. |
| 9,392,526 B2 | 7/2016 | Gohite et al. |
| 2002/0067693 A1 | 6/2002 | Kodialam et al. |
| 2002/0186658 A1 | 12/2002 | Chiu et al. |

(Continued)

OTHER PUBLICATIONS

U.S. Appl. No. 13/356,170, filed Jan. 23, 2013 entitled "System and Method for Ring Protection Switching Over Adaptive Modulation Microwave Links," Inventors: Samer M. Salam, et al.

(Continued)

*Primary Examiner* — Walli Butt

(57) ABSTRACT

A method provided in one example embodiment includes detecting a first current bandwidth of a first link in a network ring, where the first current bandwidth indicates a signal degradation on the first link. The method also includes determining whether the first current bandwidth has degraded more than a second current bandwidth of a second link in the network ring, where the second current bandwidth indicates a signal degradation on the second link. The method further includes routing one or more network flows away from the first link if the first current bandwidth has degraded more than the second current bandwidth.

20 Claims, 7 Drawing Sheets

(56) References Cited

U.S. PATENT DOCUMENTS

| | | | |
|---|---|---|---|
| 2007/0070883 | A1 | 3/2007 | Lysne |
| 2007/0230346 | A1 | 10/2007 | Yamada |
| 2009/0238067 | A1 | 9/2009 | Yannouchi et al. |
| 2010/0039935 | A1 | 2/2010 | Davison |
| 2010/0172238 | A1 | 7/2010 | Saltsidis et al. |
| 2010/0188970 | A1* | 7/2010 | Fujii ............... H04L 12/437 370/222 |
| 2011/0028146 | A1 | 2/2011 | Tammisetti |
| 2011/0080915 | A1 | 4/2011 | Baykal et al. |
| 2011/0164501 | A1 | 7/2011 | Dunbar |
| 2011/0164505 | A1 | 7/2011 | Salam et al. |
| 2012/0093002 | A1 | 4/2012 | Osborne |
| 2012/0140625 | A1 | 6/2012 | Long |
| 2012/0163224 | A1* | 6/2012 | Long ............... H04L 41/5025 370/252 |
| 2012/0195204 | A1* | 8/2012 | Patel ............... H04L 45/00 370/237 |
| 2013/0077559 | A1 | 3/2013 | Nagagawa et al. |
| 2013/0148494 | A1* | 6/2013 | Abbas ............... H04L 47/746 370/225 |
| 2013/0201820 | A1 | 8/2013 | Xiaoyong et al. |
| 2014/0254347 | A1* | 9/2014 | Xie ............... H04L 12/437 370/218 |
| 2014/0341042 | A1* | 11/2014 | Racz ............... H04L 47/122 370/237 |
| 2014/0355447 | A1 | 12/2014 | Gohite et al. |
| 2015/0055486 | A1 | 2/2015 | Maggiari et al. |
| 2015/0180766 | A1* | 6/2015 | Racz ............... H04L 47/122 370/218 |
| 2015/0208260 | A1* | 7/2015 | Ahlqvist ............... H04L 45/125 370/252 |

OTHER PUBLICATIONS

USPTO Oct. 2, 2013 Non-Final Office Action from U.S. Appl. No. 13/356,170.
USPTO Mar. 14, 2014 Final Office Action from U.S. Appl. No. 13/356,170.
USPTO Mar. 23, 2016 Final Office Action from U.S. Appl. No. 13/356,170.
USPTO Sep. 15, 2016 Final Office Action from U.S. Appl. No. 13/356,170.
Stan Kurkovsky, "Computer Networks Routing Algorithms," Based on Computer Networking, 4th Edition by Kurose and Ross, [retrieved and printed Dec. 12, 2012], 11 pages; http://www.cs.ccsu.edu/~stan/classes/cs490/slides/networks4-ch4-4.pdf.
Cisco Systems, Inc., "Multi-Topology Routing," ©2007-2010, 68 pages.
ITU-T Q9-SG 15 (Mar. 2008), "G.8032 Ethernet Ring Protection Overview," Institute of Electronics and Electrical Engineering, Mar. 2008, 23 pages.
ITU-T G.8032/Y.1344 (Feb. 2012), "Series G: Transmission Systems and Media, Digital Systems and Networks Packet over Transport aspects—Ethernet over Transport aspects Series Y: Global Information Infrastructure, Internet Protocol Aspects and Next-Generation Networks Internet protocol aspects—Transport: Ethernet ring protection switching," International Telecommunication Union Telecommunication Standardization Sector (ITU-T), Feb. 2012; Printed in Geneva, Switzerland; 104 pages.
ITU-T G.8013/Y.1731 Corrigendum 1 (Oct. 2011), :Series G; Transmission Systems and Media, Digital Systems and Networks, Packet over Transport Aspects—Ethernet over Transport Aspects; Series y: Global Information Infrastructure, Internet Protocol Aspects and Next-Generation Networks, Internet Protocol Aspects—Operation, Administration and Maintenance; OAM Functions and Mechanisms for Ethernet based networks, Corrigendum 1, International Telecommunication Union Telecommunication Standardization Sector (ITU-T), G.8013/Y.1731 Corrigendum 1, Oct. 2011, 12 pages.
ITU-T G.8013/Y.1731 Amendment 1 (May 2012), "Series G: Transmission Systems and Media, Digital Systems and Networks, Packet over Transport Aspects—Ethernet over Transport Aspects; Series &: Global Information Infrastructure, Internet Protocol Aspects and Next-Generation Networks, Internet Protocol Aspects—Operation, Administration and Maintenance; OAM functions and mechanism for Ethernet based networks Amendment 1," International Telecommunication Union Telecommunication Standardization Sector (ITU-T), G.8013/Y.1731 Corrigendum Amendment 1, May 2012, 16 pages.
ITU-T G.808.1 (Feb. 2010) "Series G: Transmission Systems and Media, Digital Systems and Networks, Digital Networks—General Aspects; Generic protection switching—Linear trail and subnetwork protection," International Telecommunication Union Telecommunication Standardization Sector (ITU-T), G.808.1, Feb. 2010, 68 pages.
ITU-T G.808.1 Amendment 1 (Aug. 2012), "Series G: Transmission Systems and Media, Digital Systems and Networks, Digital Networks—General Aspects; Generic protection switching—Linear trail and subnetwork protection, Amendment 1," International Telecommunication Union Telecommunication Standardization Sector (ITU-T), G.808.1 Amendment 1, Aug. 2012, 14 pages.
ITU-T G.808.1 Amendment 2 (Sep. 2012) Series G: Transmission Systems and Media, Digital Systems and Networks, Digital Networks—General Aspects; Generic protection switching—Linear trail and subnetwork protection; Amendment 2: New Appendix VII—Solution for Service protection in dynamic bandwidth networks, International Telecommunication Union Telecommunication Standardization Sector (ITU-T), G.808.1 Amendment 2, Sep. 2012, 10 pages.
USPTO Feb. 13, 2017 Non-Final Office Action from U.S. Appl. No. 14/844,448.
Hao Long, et al., "Proposal on adding bandwidth degradation message in Y.1731," Telecommunication Standardized Sector Study Period 2009-2012, Huawei Technologies Co., Ltd., May 2010; 5 pages.
Aviv Ronai, et al., "Flex Your Backhaul Network with Adaptive Coding & Modulation," White Paper, Ceragon Networks®, ©May 2008, 9 pages.
J. Moy, "OSPF Version 2," Network Working Group, RFC 2328, Apr. 1998, 245 pages; http://www.ietf.org/rfc/rfc2328.txt.
Rainer Baumann, et al., "A Survey on Routing Metrics," TIK Report 262, Computer Engineering and Networks Laboratory, Switzerland, Feb. 10, 2007, 53 pages.
Int'l Telecommunication Union (ITU), G.8013/Y.1731, "Series G: Transmission Systems and Media, Digital Systems and Networks," Jul. 2011, 92 pages.
Lakshman, Umesh, et al., "MPLS Traffic Engineering," Ciscopress.com, Jan. 13, 2006, http://www.ciscopress.com/articles/printerfriendly.asp?p=426640, 34 pages.

* cited by examiner

PROTECTION AGAINST FADING IN A NETWORK RING

RELATED APPLICATION

This application is a continuation (and claims the benefit of priority under 35 U.S.C. § 120) of U.S. application Ser. No. 13/903,767, filed May 28, 2013, entitled "PROTECTION AGAINST FADING IN A NETWORK RING," Inventor Pravin K. Gohite. The disclosure of the prior application is considered part of (and is incorporated by reference in) the disclosure of this application.

TECHNICAL FIELD

This disclosure relates in general to the field of network communications and, more particularly, to a protection against fading in a network ring.

BACKGROUND

Networking architectures have grown increasingly complex in communications environments, particularly mobile wireless environments. Wireless communication technologies facilitate many communications devices and systems, including satellite communications systems, portable digital assistants (PDAs), laptop computers, mobile devices (e.g., cellular telephones, user equipment), etc. Wireless communication networks typically include switches or routers connected in physical ring topologies. When wireline connectivity (e.g., Ethernet fibers) is not feasible or otherwise desirable, mobile service providers often deploy microwave links instead. For example, microwave links can be used to span difficult geography or regions where physical wires, such as fiber, cannot be laid in the ground due to cost, regulation, or other impediments.

Microwave transceivers can be coupled to switches or routers to establish a microwave link by enabling the transmission and reception of radio signals. Newer microwave transceivers have the capability of performing adaptive coding modulation (ACM). Thus, when a fading condition occurs on a microwave link, due to deteriorating weather conditions for example, the modulation scheme of the link can be changed to a more robust mode. A more robust mode implemented on a microwave link can enable continued communication, albeit at the cost of bandwidth degradation over that link. Hence, there is a challenge in providing adequate signal delivery over microwave links in various wireless network scenarios.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method provided in at least one embodiment includes detecting a first current bandwidth of a first link in a network ring, where the first current bandwidth indicates a signal degradation on the first link. The method also includes determining whether the first current bandwidth has degraded (e.g., lessened, eroded, deteriorated, faded, become burdened, etc.) more than a second current bandwidth of a second link in the network ring, where the second current bandwidth indicates a signal degradation on the second link. The method further includes routing one or more network flows away from the first link if the first current bandwidth has degraded more than the second current bandwidth.

Example Embodiments

Figure 1:
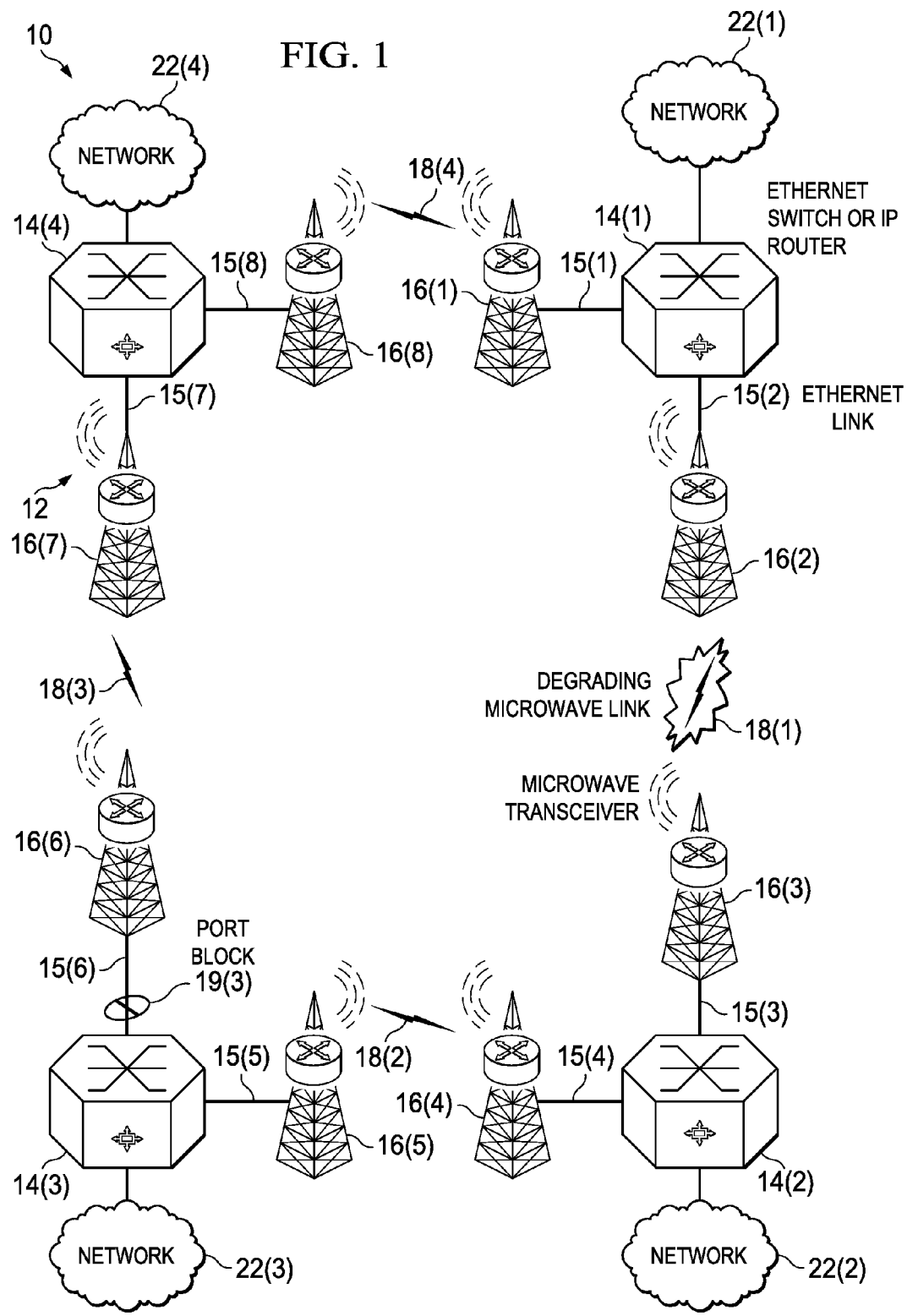
FIG. 1 is a simplified block diagram of a communication system for protecting against fading in a ring of a network environment according to at least one embodiment of the present disclosure.

FIG. 1 is a simplified block diagram of a communication system 10 for protecting against microwave multi-fading in a G.8032 ring of a network environment, according to at least one embodiment. FIG. 1 may include a plurality of Ethernet switches (or IP routers) 14(1)-14(4), microwave radio transceivers 16(1)-16(8), microwave links 18(1)-18(4), and Ethernet links 15(1)-15(8) in a closed loop network construct, referred to herein as a 'network ring' or 'ring'. The ring can operate at Layer 2 and run an Ethernet ring protection protocol, referred to as G.8032. G.8032 is an International Telecommunication Union (ITU) Telecommunication Standardization Sector (ITU-T) standard, which defines Ring Automatic Protection Switching (R-APS) protocol, in Recommendation ITU-T G.8032/Y1344, Ethernet Ring Protection Switching, published February 2012. Switches 14(1)-14(4) may be connected to microwave radio transceivers 16(1)-16(8) using Ethernet links 15(1)-15(8). Microwave radio transceivers 16(1)-16(8) may be connected pairwise over microwave links 18(1)-18(4). Any one or more of switches 14(1)-14(4) may be connected to various networks such as networks 22(1)-22(4).

In a ring topology, each node (e.g., switches 14(1)-14(4)) connects to two other nodes via communication links, forming a single continuous pathway for signals through each node. As used herein, the term 'node' refers to any electronic device, client, server, peer, service, application, or other object capable of sending, receiving, or forwarding information over communications channels in a network according to switching (and/or routing) protocols. Also, as used herein, a 'link' or 'communication link' is a transmission medium (e.g., microwave link, wired link, etc.) through which data is communicated from one node to another node. Data (e.g., in the form of a network packet) can travel from node to node, and bandwidth can be shared on all links between the nodes.

The terms 'switch' and 'router' may be interchangeably used in this Specification to refer to any node that can receive, process, and forward packets in a ring topology of a network environment. Switches and routers can serve as intermediate destinations for network traffic, receiving incoming network packets, identifying source and destination network addresses, and forwarding the packets where needed. Although four switches 14(1)-14(4) are illustrated in communication system 10, this is done merely for ease of illustration and explanation. More or fewer nodes (e.g., switches, routers, etc.) could also or alternatively be implemented in communication system 10 to provide protection against microwave multi-fading in a G.8032 ring.

In a ring topology, network traffic may be disrupted when fading conditions occur on a microwave link. When the bandwidth of a single link degrades, protection switching may prevent complete loss of connectivity. When multiple microwave links experience degradation, however, protection switching does not account for signal degradation (also referred to herein as 'bandwidth degradation') that is detected after the initial signal degradation. Embodiments of communication system 10, however, are configured to handle multiple concurrent fading conditions on the ring, and to prioritize those events such that the link with the most severe degradation is protected.

For purposes of illustrating certain example techniques of communication system 10, it is important to understand how typical communications may traverse a ring network. The following foundational information may be viewed as a basis from which the present disclosure may be properly explained. Such information is offered for purposes of explanation only and, accordingly, should not be construed in any way to limit the broad scope of the present disclosure and its potential applications.

Microwave radio links make up a significant part of last-mile backhaul connections in a telecommunications network. Mobile service providers often deploy microwave links to aggregate network traffic from mobile subscribers and to backhaul that traffic into an edge node in an Internet Protocol (IP) network. Typically, network traffic that is passed over these microwave links can be categorized in two classes. Critical priority traffic usually includes voice traffic or signaling traffic. The other class is generally referred to as best effort traffic, which primarily includes Internet traffic (e.g., browsing the Internet from a smartphone).

Unlike a wired link, whose bandwidth may remain constant, bandwidth of microwave links can change depending on various external factors (such as weather). 'Bandwidth' refers to the data rate supported by a link. Microwave links should have a line-of-sight between the receiver and transmitter and, therefore, they can be susceptible to weather conditions such as rain, hail, snow, dust, and fog, and other obstructive phenomena. As used herein, the term 'fading condition' includes any state that disrupts (e.g., disturbs, degrades, fades, reduces, breaks down, interferes with) signal propagation on the link. Commonly, fading conditions can manifest due to changing refractivity of the medium through which the radio waves propagate, typically caused by fog, rain, hail, dust, snow, and other atmospheric conditions. For example, seasonal or diurnal variations in the average refractivity gradients affect signal propagation and can contribute to fading conditions. If signal propagation is disrupted, network traffic flows over the link may be affected (e.g., because of congestion and consequent loss of packets). Microwave transceivers may react to this by changing the modulation scheme of the link. Consequently, the bandwidth can degrade, which is referred to herein as 'signal degradation' or 'bandwidth degradation.' The disruption itself is referred to herein as a 'degradation event' or a 'fading event.'

Traditional microwave radio links employed fixed modulation schemes, where any degradation in the wave propagation conditions (e.g., due to fog, rain, snow, etc.) led to a complete loss of signal and a disruption of traffic. Thus, the radio link had a binary state of either 'available' (on) or 'not available' (off). Newer microwave transceivers, with adaptive coding and modulation (ACM) capabilities, can react to these fading conditions by changing the modulation scheme of the signals, thereby changing the bandwidth of the microwave link. For instance, when the link degrades due to weather conditions, the radio changes its modulation scheme from one mode to a more robust modulation mode. The radio continues to work, but operates with less capacity. As a result, in a more robust modulation scheme, the throughput of the microwave link can degrade. Thus, the microwave link can be in several capacity or bandwidth states, and not just on or off.

Microwave links that include ACM capabilities, may experience fading conditions that cause bandwidth over the microwave links to decrease according to a step function that dictates the discrete values by which the bandwidth degrades, depending on the intensity of the fading. For example, a microwave link that operates at a nominal bandwidth of 512 Mbps (Mega bits per second) during nominal conditions may drop to a current bandwidth of 256 Mbps due to a particular fading condition such as a storm. Further fading conditions (e.g., heavier rain) could result in the bandwidth throughput dropping to 128 Mbps, to 64 Mbps, etc. in discrete steps. A 'nominal bandwidth' of a link is the available bandwidth of the link without fading conditions. A 'current bandwidth' of a link is the bandwidth determined under fading conditions.

Standard ring protection switching is triggered by failures when a complete loss of continuity is detected by the ring nodes (e.g., via loss of connectivity fault management (CFM) Continuity Check messages in the case of an ITU-T G.8032 ring). This standard ring protection does not accommodate microwave links with ACM capabilities, where a partial loss in bandwidth (or degradation) generally precedes complete connectivity loss. In microwave links with ACM capabilities, however, a mechanism may be implemented to trigger G.8032 switching based on bandwidth degradation.

Existing protection techniques, however, do not provide adequate protection for multiple concurrent fading conditions that affect multiple microwave links. Multiple concurrent fading conditions may occur, for example, when a weather pattern such as heavy rain is spread over a large geographic distance and affects multiple microwave links in a ring. The G.8032 protocol, as defined in the ITU-T standard, does not provide protection against multiple failures on a ring. Rather, the protocol provides protection against a single node, link, or port failure. Link and port failures in this regard correspond to complete signal failure, rather than signal degradation that can occur in microwave links with ACM capabilities. Although a protection switching technique applied to microwave links with ACM capabilities may trigger protection switching for the first detected fading event, subsequent fading events are generally ignored. Hence, in the case of multiple concurrent fading events, a first event may be honored, while subsequent events are ignored, even if the subsequent events result in more severe signal degradation than the initial fading event.

In an example scenario, multi-fading conditions could affect multiple microwave links during the exact same time periods or during partially overlapping time periods. For instance, if a ring topology is implemented in a metro region, multiple microwave links in the ring could potentially be subjected to a fading condition when a weather system covers the entire metro region. Each link may experience a differing degree of degradation. For instance, a first link may experience 50% degradation while a second link may experience 75% degradation. Moreover, as the weather system moves across the metro region, the degree of bandwidth degradation for any particular microwave link may vary. Consequently, service providers using microwave radios in ring topologies of their networks seek solutions to redirect traffic away from a microwave link with the most severe bandwidth degradation when multiple concurrent fading conditions affect more than one microwave link in a ring.

In accordance with at least one embodiment, communication system 10 can resolve the aforementioned issues (and others) associated with protection switching for multiple concurrent fading events in a G.8032 ring. Microwave transceivers 16(1)-16(8) may be configured to determine the current bandwidth over respective microwave links 18(1)-18(4). In at least one embodiment, microwave transceivers 16(1)-16(8) may communicate the current bandwidth under the fading condition to connected nodes (e.g., switches 14(1)-14(4)) through a mechanism based on extensions of ITU-T Y.1731 protocol. The nodes in the ring can prioritize multiple concurrent fading events on the ring such that the link with the most severe degradation is protected. Accordingly, traffic can be rerouted away from the link with the most severe bandwidth degradation, even if multiple fading events have been detected on multiple microwave links. Prioritization and rerouting can be achieved, in at least one embodiment, by using control messages (e.g., modified R-APS messages) to build bandwidth tables for each node (e.g., switch or router) in the ring. The bandwidth tables may contain current and nominal bandwidths for both the local node and the most severely degraded remote node. A state machine can be provided on each node in the ring to make intelligent decisions based, at least in part, on the associated bandwidth table. These intelligent decisions identify which ports of the nodes in the ring should be blocked and which ports should be unblocked in order to protect the most severely degraded microwave link in the ring. When a port on a node is blocked, one or more virtual local area networks (VLANs) on the node are also blocked. Conversely, when a port on a node is unblocked, one or more VLANs on the node are also unblocked.

Turning to the infrastructure of FIG. 1, switches 14(1)-14(4) are connected in a ring topology via microwave links 18(1)-18(4). Although the ring topology of communication system 10 is illustrated with only microwave links between pairs of switches, other implementations may also include one or more wirelines (e.g., Ethernet) forming connections between pairs of switches. Communication system 10 can provide protection against multiple concurrent fading events in a ring topology operating at Layer 2 and including at least two microwave links. In a ring topology with a single microwave link, however, an embodiment of communication system 10 can also provide protection against a fading event on the single microwave link.

In at least one embodiment, switches 14(1)-14(4) can detect a bandwidth degradation on a corresponding microwave link 18(1)-18(4) via communication from adjacent microwave transceivers 16(1)-16(8). Microwave transceivers 16(1)-16(8) can communicate a current bandwidth of a corresponding microwave link to adjacent switches 14(1)-14(4) using any suitable mechanism. In at least one embodiment, a nominal bandwidth of the corresponding microwave link may also be communicated to the switches. In one example, microwave transceivers 16(1), 16(3), 16(5), and 16(7) can inform respective switches 14(1)-14(4) of a nominal bandwidth and a current bandwidth of respective microwave links 18(4), 18(1), 18(2), and 18(3) using ITU-T standard Y.1731 messages. Similarly, microwave transceivers 16(2), 16(4), 16(6), and 16(8) can inform respective switches 14(1)-14(4) of a nominal bandwidth and a current bandwidth of respective microwave links 18(1)-18(4) using ITU-T standard Y.1731 messages. Although embodiments may use Y.1731 messages, any number of other protocols (e.g., Ethernet link OAM, Link Layer Discovery Protocol (LLDP), etc.) could be adapted to implement some type of reporting message for reporting nominal and current bandwidth to switches 14(1)-14(4).

In at least one embodiment, microwave radio transceivers 16(1)-16(8) may actively monitor the bandwidth over respective microwave links 18(1)-18(4) and report the statistical average of the sampled values over a monitoring interval to adjacent switches 14(1)-14(4). In some embodiments, the average bandwidth value rather than the minimum value may be communicated to switches 14(1)-14(4), for example, to avoid triggering protection mechanism as a result of a short-lived fading condition (e.g. due to an object passing through the line of sight). In other embodiments, the minimum value may be communicated to switches 14(1)-14(4). The sampling rate for the bandwidth may vary based on particular needs. In at least some embodiments, a minimum rate of 4 samples per interval for the shortest monitoring interval (e.g., 1 second) may be maintained, and the sampling rate may be increased as the monitoring interval increases.

In a typical ring topology with G.8032 protocol, a central node, referred to as a ring protection link (RPL) owner node, can block one of its ports such that one or more VLANs on the port are blocked to prevent network traffic from traveling in a continuous loop around the ring. For example, a blocked port on one of switches 14(1)-14(4) can ensure that network traffic traversing the ring flows out to one of networks 22(1)-22(4) rather than continuously looping around the ring. In this example illustration, a port on switch 14(3) in communication with microwave transceiver 16(6) is blocked at 19(3). Accordingly, network traffic flows into switch 14(3) are routed through switches 14(2), 14(1), and 14(4). At any one of these switches along the path, the network traffic may flow out of the ring to respective networks 22(2), 22(1), or 22(4). Generally, when a signal failure occurs in a G.8032 ring, port blocking may be manipulated to effectively reroute network traffic to avoid the microwave link with signal failure. For example, if a signal failure occurred on microwave link 18(1), then a port block could be instantiated on a port of switch 14(1) or switch 14(2) to protect microwave link 18(1), and port block 19(3) could be removed from switch 14(3). Thus, one or more VLANs on the blocked port of switch 14(1) or 14(2) would be blocked and one or more VLANs on the unblocked port of switch 14(3) would be unblocked.

In at least one embodiment of communication system 10, when multiple fading events occur in the ring, port blocking may be manipulated to effectively reroute network traffic to avoid the microwave link with the most severely degraded bandwidth. For example, assume a fading event first occurs on microwave link 18(1) and then on microwave link 18(2). When the fading event occurs on link 18(1), the bandwidth of that link may degrade. Microwave transceivers 16(2) and 16(3) can determine the nominal and current bandwidths of microwave link 18(1) and report this information to respective switches 14(1) and 14(2).

When a switch, such as switch 14(2), detects the bandwidth degradation on link 18(1) (e.g., via the reception of a Y.1731 message from microwave transceiver 16(3)), the switch can compare the received current bandwidth against a failover threshold. A failover threshold may be determined through a configured policy, which could be configured by a user in at least one embodiment. If the current bandwidth is less than the threshold, then switch 14(2) can send control messages to other nodes in the ring (e.g., switches 14(1), 14(3), and 14(4)) to trigger failover. Switch 14(1) can also detect the bandwidth degradation of link 18(1), compare the received current bandwidth against a failover threshold, and send control messages to other nodes in the ring if the bandwidth is less than the threshold.

In at least one embodiment, control messages can be R-APS messages with a manual switched (MS) code that triggers failover. The R-APS messages may be modified to carry a new type-length-value (TLV) element that encodes the nominal and current bandwidths of the degraded link as reported from the microwave transceivers. Switches 14(1) and 14(2) can each establish a port block on their respective ports connected to degraded link 18(1), until a determination is made regarding which switch will maintain a port block for the degraded link.

Switches in the ring can build respective bandwidth caches of local bandwidth information (i.e., local current and nominal bandwidths received in a local reporting message) and remote bandwidth information (i.e., remote current and nominal bandwidths received in a control message). Each switch in a ring can have two ports (e.g., Port 0 and Port 1) connected to respective adjacent microwave links. Accordingly, in the example provided, when the reporting message from microwave transceiver 16(3) is received at Port 0 of switch 14(2), the received local bandwidth information can be mapped to Port 0 in a bandwidth cache. When switches 14(1), 14(3), and 14(4) receive a control message from switch 14(2), these switches can build (or update) their own bandwidth caches of the incoming ports and the received remote current and nominal bandwidth values. Similarly, when the reporting message from microwave transceiver 16(2) is received at Port 1 of switch 14(1), the received local bandwidth information can be mapped to Port 1 in a bandwidth cache. When switches 14(2), 14(3), and 14(4) receive a control message from switch 14(1), these switches can build (or update) their own bandwidth caches of the incoming ports and the received remote current and nominal bandwidth values.

When a subsequent, more severe fading event occurs in the ring, each node that detects the signal degradation may send an R-APS (MS) message with a new TLV for the degraded bandwidth that was detected. For example, if the new fading event occurs on link 18(4), then switches 14(1) and 14(4) can detect the signal degradation and send R-APS messages with bandwidth information (i.e., current and nominal bandwidths) of the degraded link to other nodes in the ring. Using their bandwidth caches, nodes receiving the R-APS messages can compare whether local fading or remote fading is more severe. Nodes can rely upon either absolute bandwidth values or upon degradation percentages. If degradation percentages are used, then when multiple fading events have the same degradation percentage, the link with the lower nominal bandwidth may be protected since it has a lower capacity. Based on the comparisons performed by the nodes, a node with the most severe degradation is identified and the other nodes can stop transmitting their R-APS messages. A timer may be used to provide dampening and to ensure network stability in the case of multiple fading conditions. This timer ensures that switchover events due to worsening fading conditions on different nodes are dampened.

Networks 22(1)-22(4) represent a series of points or nodes of interconnected communication paths for transmitting packets of information to and receiving packets of information from communication system 10. Networks 22(1)-22(4) offer a communicative interface between nodes, and may be any local area network (LAN), wireless LAN (WLAN), wireless area network (WAN), metropolitan area network (MAN), Intranet, Extranet, virtual private network (VPN), virtual local area network (VLAN), or any other appropriate architecture or system that facilitates communications in a network environment. Networks 22(1)-22(4) may implement a user datagram protocol/IP (UDP/IP) connection and use a transmission control protocol/Internet Protocol (TCP/IP) communication language protocol in particular embodiments of the present disclosure. Further, networks 22(1)-22(4) may implement any other suitable communication protocol for transmitting data packets to and receiving data packets from communication system 10.

The architecture of the present disclosure can be associated with a service provider Radio Access Network (RAN) backhaul deployment. In other examples, the architecture of the present disclosure could be applicable to other communication environments, cable scenarios, microwave systems generally, broadband generally, fixed wireless instances, fiber to the x (FTTx), which is a generic term for any broadband network architecture that uses optical fiber in last-mile architectures, and any other suitable networking architectures. The architecture of the present disclosure may include a configuration capable of TCP/IP communications for the transmission and/or reception of packets in a network. The architecture of the present disclosure may also operate in conjunction with UDP/IP or any other suitable protocol, where appropriate and based on particular needs. Moreover, although the embodiment of communication system 10 described with respect to FIG. 1 relates to microwave links, the operations described herein can be implemented on any switch/router directly connected to a communication link (not necessarily microwave links) capable of adaptive bandwidth modulation.

Switches 14(1)-14(4) and microwave transceivers 16(1)-16(8) are network elements that can facilitate the ring protection switching activities discussed herein. In some embodiments, switches 14(1)-14(4) may forward packets according to certain specific protocols (e.g., TCP/IP, UDP, etc.). As used herein, the term "network element" is meant to encompass switches, routers, transceivers, cable boxes, gateways, bridges, loadbalancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, switches 14(1)-14(4) and microwave transceivers 16(1)-16(8) include software to achieve (or to foster) the ring protection switching activities discussed herein. In other embodiments, these ring protection switching activities may be executed externally to these elements, or included in some other network element to achieve the intended functionality. Alternatively, switches 14(1)-14(4) and microwave transceivers 16(1)-16(8) may include software (or reciprocating software) that can coordinate with other network elements in order to achieve the ring protection switching activities described herein. In still other embodiments, one or several devices may include any suitable algorithms, hardware, software, firmware, components, modules, interfaces, or objects that facilitate the operations thereof.

Figure 2:
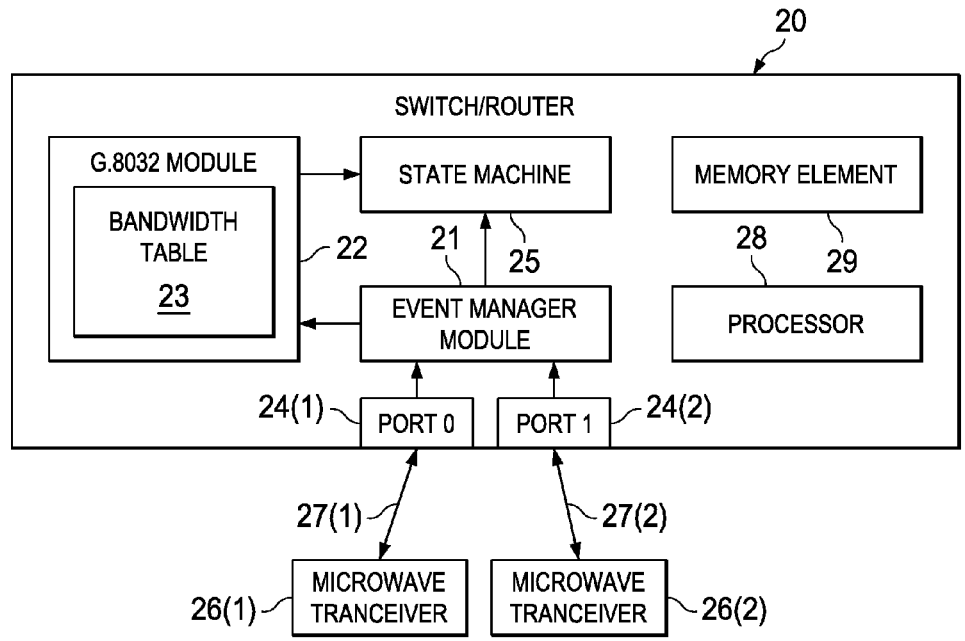
FIG. 2 is a simplified block diagram illustrating possible example details associated with the communication system according to at least one embodiment.

Turning to FIG. 2, FIG. 2 is a simplified block diagram illustrating one possible set of details associated with communication system 10. FIG. 2 illustrates an example switch 20 configured for protection against multiple fading events in a G.8032 ring. Switch 20 is representative of one or more nodes in communication system 10, such as switches 14(1)-14(4), which are connected to microwave links. In order to achieve protection for all microwave links in a G.8032 ring, in at least one embodiment, each node that is directly connected to a microwave transceiver is configured for protection against multiple fading events. Other nodes in the G.8032 ring that are not directly connected to any microwave links may not necessarily be configured for protection against multiple fading events, and may only implement the G.8032 protocol and/or other protocols that do not accommodate multi-fading. Thus, embodiments herein may be backwards compatible with existing G.8032 rings having one or more microwave links.

Example switch 20 is shown with Port 0 connected to a microwave transceiver 26(1) via Ethernet link 27(1) and with Port 1 connected to a microwave transceiver 26(2) via Ethernet link 27(2). Port 0 and Port 1 are referenced by 24(1) and 24(2), respectively. In other implementations, only one of the ports of switch 20 may be connected to a microwave link, while another port may be connected to a wireline such as Ethernet.

Switch 20 may also include an event manager module 21, a G.8032 module 22, and a state machine 25. G.8032 module 22 may include a bandwidth table 23, for storing nominal and current bandwidths detected at local ports (i.e., Port 0 and Port 1) and received in control messages from remote nodes. Bandwidth table 23 can be configured in any type of memory and may be internal or external (in whole or in part) to switch 20. In at least one embodiment, bandwidth table 23 may be stored in local cache of switch 20. Event manager module 21 may receive, from microwave transceivers 26(1) and 26(2), reporting messages containing local bandwidth information of adjacent microwave links. Event manager module 21 may provide the local bandwidth information to G.8032 module 22. G.8032 module 22 can update bandwidth table 23 with local current and nominal bandwidths associated with Port 0 and Port 1 of switch 20. Event manager module 21 may also receive, from other nodes in the ring, control messages (e.g., R-APS messages) containing remote bandwidth information. Event manager module 21 may provide the remote bandwidth information to G.8032 module 22. G.8032 module 22 can update bandwidth table 23 with remote current and nominal bandwidths of a remote node.

State machine 25 makes intelligent decisions regarding which ports should be blocked and which ports should be unblocked in various states. State machine 25 can also determine when switch 20 should send or stop sending control messages for a particular state machine event. The decisions made by state machine 25 are based, at least in part, on information in bandwidth table 23. At least one processor 28 and at least one memory element 29 may facilitate the operations of switch 20.

Figure 3:
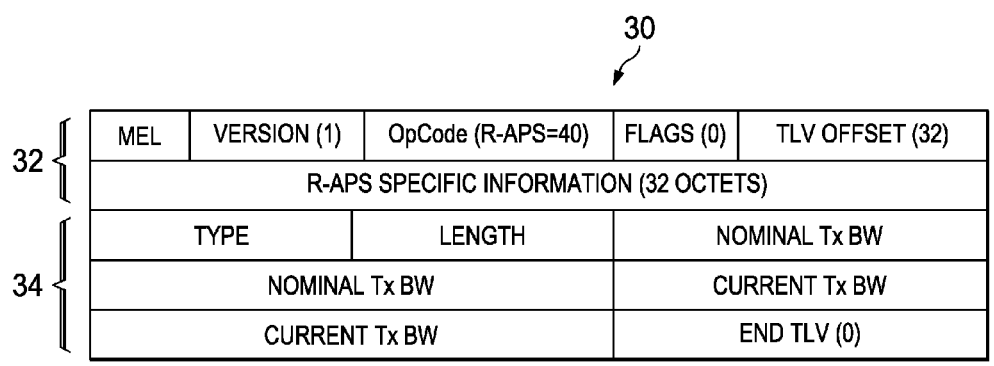
FIG. 3 is a simplified block diagram illustrating possible example details associated with a control packet for a G.8032 ring according to at least one embodiment.

Turning to FIG. 3, a block diagram illustrates an example of a modified packet format 30 for an R-APS message (e.g., protocol data unit (PDU)) of G.8032 protocol. R-APS messages in modified format 30 are control packets (also referred to herein as 'control messages') that may be used in at least one embodiment of communication system 10. R-APS message format 30 includes typical R-APS fields 32, including a maintenance entity group (MEG) level (MEL), version, OpCode (e.g., R-APS=40), flags, type-length-value (TLV) offset field, and R-APS specific information field. The TLV offset can include an offset to TLV fields 34, which may be appended to R-APS fields 32 in order to enable multi-fading protection switching in at least one embodiment. TLV fields 34 may include nominal bandwidth and current bandwidth of a microwave link that experienced a fading event and that is connected to the node that created the R-APS message. The type field can indicate that TLV fields carry bandwidth information. The length field can indicate the length of TLV fields 34. The end TLV field can indicate the end of the TLV fields in the R-APS message. Appended TLV fields 34 enable communication of bandwidth information from one node to another node in a G.8032 ring. Thus, each node can build and maintain a bandwidth table that includes remote bandwidth information of a degraded microwave link attached to another node.

Figure 4:
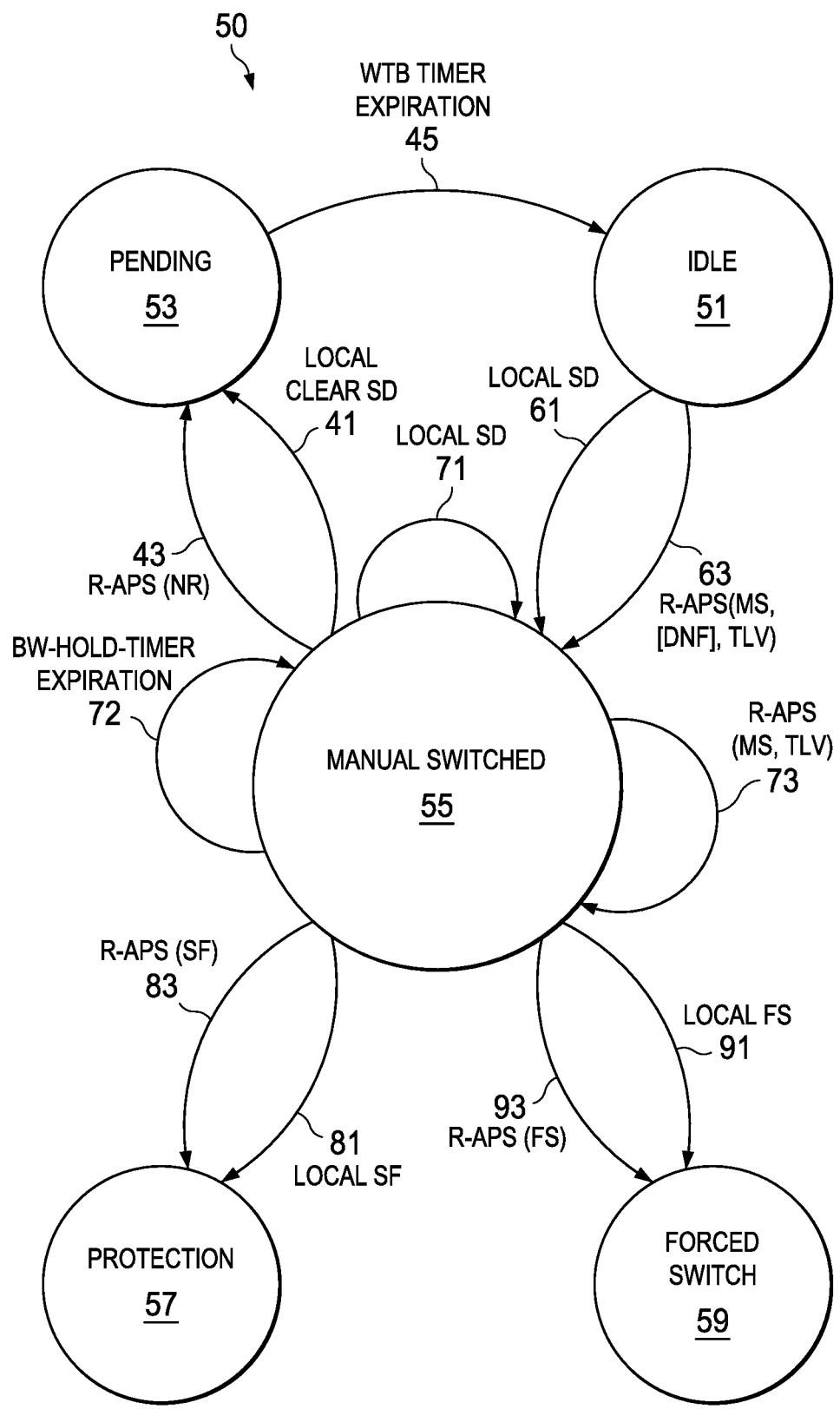
FIG. 4 is a simplified state diagram generally representing states and transitions that may occur in a communication system according to at least one embodiment.

FIG. 4 is a state diagram 50 generally representing states, events, and transitions that may occur in accordance with aspects of the subject matter described herein. The states may include an idle state 51, a pending state 53, a manual switched state 55, a protection state 57, and a forced switch state 59. Although at least one embodiment includes the states, events, and transitions provided in FIG. 4, it will be apparent that more, less, and/or different states may be included to achieve multi-fading protection switching as described herein.

A state may correspond to one or more events that occur within communication system 10. In at least one embodiment, events that correspond to the states may be detected by, or may occur in, a node containing a state machine such as state machine 25 of switch 20 in FIG. 2. The events may be related to a fading condition on one or more microwave links in communication system 10. For ease of illustration, FIG. 4 will be explained with reference to an 'event node,' which may be configured as shown and described with reference to switch 20 of FIG. 2 and configured in a network ring (e.g., G.8032 ring) as shown, for example, in FIG. 1. The event node is a node in the ring in which an event occurs and a state machine of the event node performs certain operations based on the event and on the current state of the event node. Other nodes in the ring may be referred to simply as 'nodes' or 'node' as appropriate.

Idle State—Local SD Event

A state machine of event node may begin in idle state 51 (e.g., upon start up of the node). In idle state 50, there are no bandwidth degradations or link failures in the ring, and nodes in the ring are forwarding network traffic as expected. When the event node is in idle state 51, a local signal degradation ('local SD') event 61 may occur, which can be detected by the event node. For example, the event node may receive a message (e.g., a Y.1731 message) from an attached microwave transceiver providing nominal and current bandwidth values of the corresponding microwave link. The received current bandwidth is compared to the failover thresholds, determined through a configured policy. If the current bandwidth is less than the threshold, then the following pseudo code represents logic, and also operations based on the logic that the state machine may perform in response to local SD event 61, occurring when the event node is in idle state 51:

```
If requested port is blocked
    Tx R-APS (MS, DNF, TLV)
    Unblock non-requested port
ELSE
    Block requested port
    Unblock non-requested port
    Tx R-APS (MS, TLV)
    Perform FDB Flush
    Update Bandwidth Table
```

In the pseudo code, 'requested port' is intended to mean the port associated with the particular event. In this scenario, the requested port is the port connected to the degraded microwave link, and on which the bandwidth information was received from an adjacent microwave transceiver. If the requested port is already blocked, then the event node can transmit an R-APS message with MS, DNF, and TLV codes. In at least one embodiment, R-APS messages may be broadcast from one node to all other nodes in the ring. The MS code indicates the event is a manual switched event, and a remote node has sent the R-APS message with the MS code. The DNF code is a 'do not flush' code that instructs the recipient nodes that they do not need to flush a forwarding database (FDB) because there has been no topology change. The TLV code indicates that the R-APS message contains bandwidth information (i.e., nominal and current bandwidth of a microwave link detected by the event node that created the R-APS message). The event node may also unblock a non-requested port that did not detect a signal degradation.

If the requested port is not blocked, however, then the event node can block the requested port and unblock the non-requested port. The event node may transmit an R-APS message with MS and TLV codes. The R-APS message may not include a DNF code because the fading event was detected on a port that was not already blocked. Thus, other nodes in the ring need to flush their forwarding databases (FDBs) since the topology has changed with the newly blocked port of the event node. The event node may also flush its own FDB. Regardless of whether the requested port was already blocked or had to be blocked by the event node, the event node can also update its bandwidth table with local nominal and current bandwidths of the degraded microwave link. Additionally, when the state machine performs appropriate operations in response to local SD event 61, the event node transitions from idle state 51 to manual switched state 55.

Idle State—R-APS (MS, [DNF], TLV) Event

When the event node is in idle state 51, an R-APS event 63 may occur. In this scenario, a remote signal degradation occurs, and the event node receives an R-APS message from another node about the remote signal degradation. The R-APS message indicates that signal degradation (or fading) was detected by the other node. The received R-APS message may include MS and TLV codes, and possibly a DNF code. In at least one embodiment, the following pseudo code represents logic, and also operations based on the logic, that the state machine may perform in response to R-APS event 63, occurring when the event node is in idle state 51:

```
Update Bandwidth Table
Unblock Both Ring Ports
FDB Flush (if needed by flush logic)
Stop Tx R-APS
```

According to the example logic, the event node updates its bandwidth table with nominal and current bandwidths of a remote node, which are contained in the received R-APS message. The event node may unblock both of its ports connected to the ring. The event node can flush its FDB, for example, if the received R-APS message does not contain a DNF code. However, if the received R-APS message contains a DNF code, then the event node may not flush its FDB. The event node may also stop transmitting any R-APS messages, if any are currently being transmitted. In this scenario, when the state machine performs appropriate operations in response to R-APS event 63, the event node transitions to from idle state 51 to manual switched state 55.

Manual Switched State—Local SD Event

When the event node is in manual switched state 55, three events could occur in which the state of the event node does not transition to another state. The first event is a local SD event 71, previously described herein. The event node may receive current bandwidth of an adjacent microwave link affected by a fading condition. The event node can then compare the current bandwidth of the degraded microwave link to failover thresholds. If the current bandwidth is less than the thresholds, then the following pseudo code represents logic, and also operations based on the logic, that the state machine may perform in response to local SD event 71, occurring when the event node is in manual switched state 55:

```
Update Bandwidth Table
If Requested Port is blocked
    Tx R-APS (MS, DNF, TLV)
ELSE
    If Local SD% > Remote SD%
        Start BW-Hold-Timer
    Else
        Stop BW-Hold-Timer (If running)
```

According to the example logic, the requested port is the port connected to the degraded microwave link, and on which the bandwidth information was received from an adjacent microwave transceiver. According to the example pseudo code for this scenario, the event node can update its bandwidth table with local current and nominal bandwidths received from an adjacent microwave transceiver. If the requested port is already blocked, then the event node can transmit, to other nodes in the ring, an R-APS message with MS, DNF, and TLV codes.

If the requested port is not blocked, then in at least one embodiment, a local signal degradation percentage ('local SD %') can be compared to a remote signal degradation percentage ('remote SD %'). Generally, signal degradation percentage (SD %) can be calculated as follows:

$$SD\% = (\text{Nominal BW} - \text{Current BW}) * 100 / \text{Nominal BW}$$

In at least one embodiment, for local SD event 71 the current and nominal bandwidths used to calculate the local SD % include the bandwidth values received from the adjacent microwave transceiver reporting the signal degradation. Also for local SD event 71, the current and nominal bandwidths used to calculate remote SD % may be obtained from the bandwidth table of the event node. In other embodiments, absolute bandwidth values could be compared, rather than signal degradation percentages.

If the local SD % is greater than the remote SD %, then a bandwidth hold timer ('BW-Hold-Timer') for the event node may be started. Generally, the BW-Hold-Timer can be a configurable timer set to a predefined amount of time to determine whether a detected fading event is a temporary event or a persisting event. Thus, BW-Hold-Timer can be used to minimize switching port blocks during transient fading events. A variable delay can be added to configured BW-Hold-Timers based on signal degradation percentage, such that the BW-Hold-Timer of the node with the greatest signal degradation percentage expires first, to avoid race condition during port block selection. BW-Hold-Timers may be configurable by a user, for example, a user with network administrator privileges. In at least one embodiment, R-APS messages may not be sent by the event node until the BW-Hold-Timer expires. In this scenario, when the state machine performs appropriate operations in response to local SD event 71, the event node remains in manual switched state 55.

If the local SD % is not greater than the remote SD %, then the BW-Hold-Timer for the event node may be stopped, if it is running. This will ensure the BW-Hold-Timer is stopped if it was started by an earlier remote R-APS or local SD event. For example, if an earlier local SD event was transiently more severe than a remote SD event, it may have started BW-Hold-Timer.

Manual Switched State—BW-Hold-Timer Expiration Event

A second event that may occur when the event node is in manual switched state 55, where the event node remains in manual switched state 55, is the expiration of the BW-Hold-Timer. In at least one embodiment, the following pseudo code represents logic, and operations based on the logic, that the state machine may perform in response to a BW-Hold-Timer expiration event 72, when the event node is in manual switched state 55:

```
Update Bandwidth Table
Block Current Port
Unblock Opposite Port
Tx R-APS (MS, TLV)
FDB Flush
```

According to the example logic, the event node can update its bandwidth table with local current and nominal bandwidths received from an adjacent microwave transceiver for a degraded microwave link. The event node can also block the current port on the event node, which is the port associated with a previously detected signal degradation on an adjacent microwave link (e.g., local SD event 71). The port is blocked because when the BW-Hold-Timer expires, this indicates that the previously detected signal degradation associated with the port was persistent rather than transient. The event node can also unblock the opposite port, transmit an R-APS message with MS and TLV codes, and flush the forwarding database of the event node. In this scenario, when the state machine performs appropriate operations in response to BW-Hold-Timer expiration event 72, the event node remains in manual switched state 55, with a blocked port.

Manual Switched State—R-APS (MS, TLV) Event

A third event that may occur when the event node is in manual switched state 55, where the event node remains in manual switched state 55, is an R-APS event 73. In this scenario, a remote signal degradation occurs, and the event node receives an R-APS message from another node about the remote signal degradation. The received R-APS message indicates that signal degradation (or fading) was detected by the other node. The received R-APS message may include MS and TLV codes. In at least one embodiment, the following pseudo code represents logic, and also operations based on the logic, that the state machine may perform in response to R-APS event 73, when the event node is in manual switched state 55:

```
Update Bandwidth Table
IF Local SD && Any Port Blocked
    IF Local SD% > Remote SD%
        Ignore R-APS
    ELSE IF Local SD % < Remote SD%
        Unblock Blocked Ports
        Stop Tx R-APS
    ELSE IF Local Nom < Remote Nom
        Ignore R-APS
    ELSE IF Local Nom > Remote Nom
        Unblock Blocked Ports
        Stop Tx R-APS
    ELSE IF Local Node-ID > Remote Node-ID
        Ignore R-APS
    ELSE
        Unblock Both Ports
        Stop Tx R-APS
ELSE IF Local SD && All Ports Unblocked
    IF Local SD% > Remote SD%
        Start BW-Hold-Timer
    ELSE
        Stop BW-Hold-Timer
END
```

According to the example logic, the event node updates its bandwidth table with nominal and current bandwidths of a remote node, which are contained in the received R-APS message. If the event node previously detected local signal degradation ('local SD') and any port of the event node is blocked, then signal degradation percentages (or absolute bandwidths) may be compared. In at least one embodiment for R-APS event 73, the current and nominal bandwidths used to calculate local SD % may be obtained from the bandwidth table of the event node. Also for R-APS event 73, the current and nominal bandwidths used to calculate remote SD % may be the bandwidth values received in the R-APS message. If the local SD % is greater than the remote SD %, then the R-APS message may be ignored. This is because the blocked port of the event node is associated with the most severe signal degradation known to the event node. Otherwise, if the local SD % is less than the remote SD %, then the event node can unblock its blocked ports and stop transmitting R-APS messages.

If the local SD % is equivalent to the remote SD %, then local and remote nominal bandwidths may be compared. If the local nominal bandwidth ('Local Nom') from the bandwidth table of the event node is less than the remote nominal bandwidth ('Remote Nom') from the R-APS message, then the event node may ignore the received R-APS message. Otherwise, if the Local Nom is greater than the Remote Nom, then the event node can unblock its blocked ports and stop transmitting R-APS messages.

If the local SD % is equivalent to the remote SD %, and the Local Nom is equivalent to the Remote Nom, then some type of selection criteria is used to determine port blocking on the event node and the remote node. In at least one embodiment, node identifiers may be used. For example, if a local node identifier ('Local Node-ID') of the event node is greater than a remote node identifier ('Remote Node-ID') of the remote node that generated the R-APS message, then the event node may ignore the R-APS message. Thus, the event node maintains its port block for its adjacent degraded microwave link. Otherwise, if the Local Node-ID is not greater than the Remote Node-ID, then the event node may unblock both ports and stop transmitting R-APS messages.

Thus, the remote node that generated the R-APS message may maintain its port block of its adjacent degraded microwave link (which may or may not also be adjacent to the event node). It will be apparent that any other suitable criteria could be used to determine port blocking between nodes with equivalent signal degradations and equivalent nominal bandwidths.

If the event node previously detected a local SD and all of its ports are unblocked, then signal degradation percentages (or absolute bandwidths) may be compared. If the local SD % is greater than the remote SD %, then the BW-Hold-Timer may be started. If the local SD % is not greater than the remote SD %, then the BW-Hold-Timer may be stopped. Additionally, when the state machine performs appropriate operations in response to R-APS event 73, the event node remains in manual switched state 55.

Manual Switched State—Local CLEAR SD Event

When the event node is in manual switched state 55, two events could occur in which the event node potentially transitions to pending state 53. One event is a local clear signal degradation ('local CLEAR SD') event 41, in which a previously detected signal degradation (or failure) of a microwave link has recovered. In at least one embodiment, local CLEAR SD event 41 occurs when the event node receives a message (e.g., a Y.1731 message) from an attached microwave transceiver providing nominal and current bandwidth values of the corresponding microwave link that indicate the current bandwidth has been restored. The following pseudo code represents logic, and also operations based on the logic, that the state machine may perform in response to local CLEAR SD event 41, when the event node is in manual switched state 55:

---
Clear Bandwidth Table
If Requested Port is blocked
    Start Guard Timer
    Tx R-APS (NR)
    IF RPL Owner && Revertive
        Start WTB Timer
ELSE (No State Change)
    Stop BW-Hold-Timer (if running)
---

According to the example logic, the requested port is the port on the event node that is connected to the recovered microwave link, and on which the bandwidth information was received from an adjacent microwave transceiver. If the requested port is already blocked, then the event node can start a guard timer, which is part of the G.8032 standard. The guard timer can be used by nodes when changing states to block latent outdated messages from causing unnecessary state changes and, further, it can transmit an R-APS message with an NR code to other nodes in the ring. The NR code informs the other nodes that the ring is recovering. More specifically, the NR code can indicate that there is no failure in the ring and no administrative forced manual switch in the ring.

If the requested port is blocked, and if the event node is the RPL node and is revertive, then a wait-to-block (WTB) timer may be started. Generally, a WTB timer is a protocol timer that introduces a predefined time period after which a node can transition from pending state 53 to idle state 51 during a revertive operation in which port blocking is switched back to the node that is the RPL owner. Thus, if the event node is the RPL owner, the WTB timer can help protect against unnecessarily switching the port blocking when another fading event occurs in the ring soon afterwards. Additionally, if the local CLEAR SD event occurs when the requested port is blocked, then when the state machine performs appropriate operations in response to local CLEAR SD event 41, the event node transitions from manual switched state 55 to pending state 53.

If the requested port is not blocked, however, then the event node can stop the BW-Hold-Timer if it is currently running. Additionally, the event node does not transition to pending state 53, but rather remains in manual switched state 55 if the requested port is not blocked. This is because, if the requested port is not blocked, then another port of the event node or another port of another node is currently blocked due to its status as having the most severe signal degradation in the ring. Thus, even if the event node is the RPL owner, revertive operations may not be performed until all signal degradations within the ring have been restored.

Manual Switched State—R-APS(NR) Event

A second event that may occur when the event node is in manual switched state 55, where the event node then transitions to pending state 53, is an R-APS event 43. In this scenario, a remote signal recovery occurs, and the event node receives an R-APS message from another node about the signal recovery. The received R-APS message contains an NR code indicating that the signal degradation previously detected by the other node has recovered. In at least one embodiment, the following pseudo code represents logic, and also operations based on the logic, that the state machine may perform in response to R-APS event 43, when the event node is in manual switched state 55:

---
Clear Bandwidth Table
If Local SD
    Start BW-Hold-Timer
    ELSE IF RPL Owner && Revertive
        Start WTB Timer
---

According to the example logic, the event node clears the remote entries in its bandwidth table in response to receiving an R-APS message with an NR code. If Local SD has previously been detected by the event node, then the event node can start the BW-Hold-Timer. Otherwise, if the event node is the RPL node and is revertive, then the WTB timer may be started. In particular, if the event node is the RPL owner, then revertive operations may be performed to switch the port block back to the event node once the WTB timer expires. The WTB timer helps ensure that port block switching is not performed unnecessarily, by delaying the switching operations until after the WTB timer expires. Additionally, when the state machine performs appropriate operations in response to R-APS event 43, the event node transitions from manual switched state 55 to pending state 53.

Manual Switched State—Local SF Event

When the event node is in manual switched state 55, two events could occur in which the event node transitions to a protection state 57. One event is a local signal fail ('local SF') event 81. Local SF event 81 is related to a signal failure of a link, where the link is connected to a port on the event node and the event node detects the failure. The following pseudo code represents logic, and also operations based on the logic, that the state machine may perform in response to the local SF event 81, when the event node is in manual switched state 55:

---
If Port is blocked
    Tx R-APS (SF, DNF)
---

```
        ELSE
            Stop BW-Hold-Timer (if running)
            Block Failed Port
            Unblock Non-failed Port
            Tx R-APS (FS)
```

According to the example logic, if the port on the event node is already blocked, the event node transmits an R-APS message with SF and DNF codes to other nodes in the ring. The SF code indicates a signal failure was detected by the event node. If the port on the event node is not blocked, however, then the event node stops the BW-Hold-Timer if it is running, blocks the failed port (the port that detected the signal failure), unblocks the non-failed port, and transmits an R-APS message with a forced switch (FS) code. In this scenario, when the state machine performs appropriate operations in response to local SF event 81, the event node transitions from manual switched state 55 to protection state 57.

Manual Switched State—R-APS (SF) Event

A second event that may occur when the event node is in manual switched state 55, where the event node then transitions to protection state 57, is an R-APS event 83. For this event, a signal failure could occur on a remote link in the ring and the event node receives an R-APS message from another node about the signal failure. The received R-APS message contains an SF code indicating that the other node detected the signal failure on a physical link. In at least one embodiment, the following pseudo code represents logic, and also operations based on the logic, that the state machine may perform in response to R-APS event 83, when the event node is in manual switched state 55:

```
        If Port is blocked
            Unblock Port
            Stop Tx R-APS
        ELSE
            Stop BW-Hold-Timer (if running)
```

According to the example logic, if a port on the event node is already blocked, the event node unblocks the port and stops transmitting R-APS messages. A port could potentially be blocked on the event node if the event node had previously detected a signal degradation and determined it was the most severe signal degradation in the ring. A signal failure, however, is more severe than signal degradation, so the port associated with the signal degradation is unblocked to allow the other node to block the port associated with the signal failure. If ports on the event node are not blocked, however, then the event node can stop the BW-Hold-Timer if it is running. The BW-Hold-Timer could be running if the event node had recently detected a signal degradation but was waiting for the expiration of the BW-Hold-Timer to block the associated port. In this scenario, when the state machine performs appropriate operations in response to R-APS event 83, the event node transitions from manual switched state 55 to protection state 57.

Manual Switched State—Local FS Event

When the event node is in manual switched state 55, two events could occur in which the event node transitions to a forced switch state 59. One event is a local forced switch ('local FS') event 91. Local FS event 91 is related to a command that has been entered on the event node to force the state and port block on the event node. In at least one embodiment, a local FS event is triggered by the actions of a user, such as a network administrator. In at least one embodiment, this event can override state transitions and port blocks resulting from signal failures or signal degradations. The following pseudo code represents logic, and also operations based on the logic, that the state machine may perform in response to local FS event 91, when the event node is in manual switched state 55:

```
        If Port is blocked
            Tx R-APS (FS, DNF)
        ELSE
            Stop BW-Hold-Timer (if running)
            Block FS Port
            Tx R-APS (FS)
```

According to the example logic, if a port on the event node is already blocked, the event node transmits an R-APS message with FS and DNF codes to other nodes in the ring. The FS code indicates a forced switch command was detected by the event node and the DNF code instructs the recipient node to flush its forwarding database. If a port on the event node is not blocked, however, then the event node stops the BW-Hold-Timer if it is running, blocks the FS port (i.e., the port to be blocked based on the local FS event), and transmits an R-APS switch with an FS code. In this scenario, when the state machine performs appropriate operations in response to local FS event 91, the event node transitions from manual switched state 55 to forced switched state 59.

Manual Switched State—R-APS (FS) Event

A second event that may occur when the event node is in manual switched state 55, where the event node then transitions to forced switch state 59, is an R-APS event 93. For this event, a forced switch could occur on another node in the ring, and the event node receives an R-APS message from the other node where the forced switch event occurred (e.g., an administrator initiated a forced switch on the other node). The received R-APS message contains an FS code indicating that the other node detected a forced switch event. In at least one embodiment, the following pseudo code represents logic, and also operations based on the logic, that the state machine may perform in response to R-APS event 93, when the event node is in manual switched state 55:

```
        If Port is blocked
            Unblock Port
            Stop Tx R-APS
        ELSE
            Stop BW-Hold-Timer (if running)
```

According to the example logic, if a port on the event node is already blocked, the event node unblocks the port and stops transmitting R-APS messages. A port could potentially be blocked on the event node if the event node had previously detected a signal degradation and determined it was the most severe signal degradation in the ring. A forced switch, however, may override a signal degradation, so the port on the event node associated with the signal degradation is unblocked to allow the other node to block the port associated with the forced switch. If ports on the event node are not blocked, however, then the event node can stop the BW-Hold-Timer if it is running. The BW-Hold-Timer could be running if the event node had recently detected a signal degradation but had not yet blocked the associated port. In this scenario, when the state machine performs appropriate operations in response to R-APS event 93, the event node transitions from manual switched state 55 to forced switch state 59.

Pending State—WTB Expiration Event

When the event node is in pending state 53, a WTB timer expiration event 45 could occur. In this scenario, the WTB timer expires, which can trigger revertive operations to be performed to switch port blocking in the ring to the event node. In at least one embodiment, the following pseudo code represents logic, and also operations based on the logic, that the state machine may perform in response to WTB timer expiration event 45, when the event node is in pending state 53:

```
If RPL Owner
    Stop WTR
    If Port is blocked
        Tx R-APS (NR, RB, DNF)
    ELSE
        Block RPL Owner
        Tx R-APS (NR, RB)
        FDB Flush
```

According to the example logic, if the event node is the RPL owner, then a wait-to-restore (WTR) timer can be stopped. Generally, an WTR timer may be set when an RPL owner receives information indicating that signal failure on a remote microwave link has recovered. The RPL owner may receive this information via an R-APS message with an NR code. If the WTB timer has expired, however, then the WTR timer can be stopped.

If a port is blocked on the event node, then the event node transmits an R-APS message with NR, RB, and DNF codes. The RB code indicates that the RPL owner has blocked its RPL port. If none of the ports on the event node are blocked, however, then the event node may block a port on the event node, transmit an R-APS message with NR and RB codes, and perform an FDB flush. In this case, the R-APS message informs the node associated with the recovered link to unblock its blocked port. The R-APS message indicates that the forwarding tables are changing since the blocking is being switched back to the event node. Thus, the forwarding tables of the event node are flushed and the lack of a DNF code in the R-APS message implicitly instructs other nodes to flush their forwarding databases. In this scenario, when the state machine performs appropriate operations in response to WTB timer expiration event 45, the event node transitions from pending state 53 to idle state 51.

In at least one embodiment, priority logic of G.8032 protocol is not changed by logic implemented in accordance with state diagram 50. In particular, forced switch (FS), signal fail (SF), R-APS(SF), and R-APS (FS) may take precedence over manual switched state. Embodiments including the manual switched state, however, introduce a quantitative measure of signal degradation via current and nominal bandwidths, using absolute values or signal degradation percentages of the bandwidths.

Figure 5A:
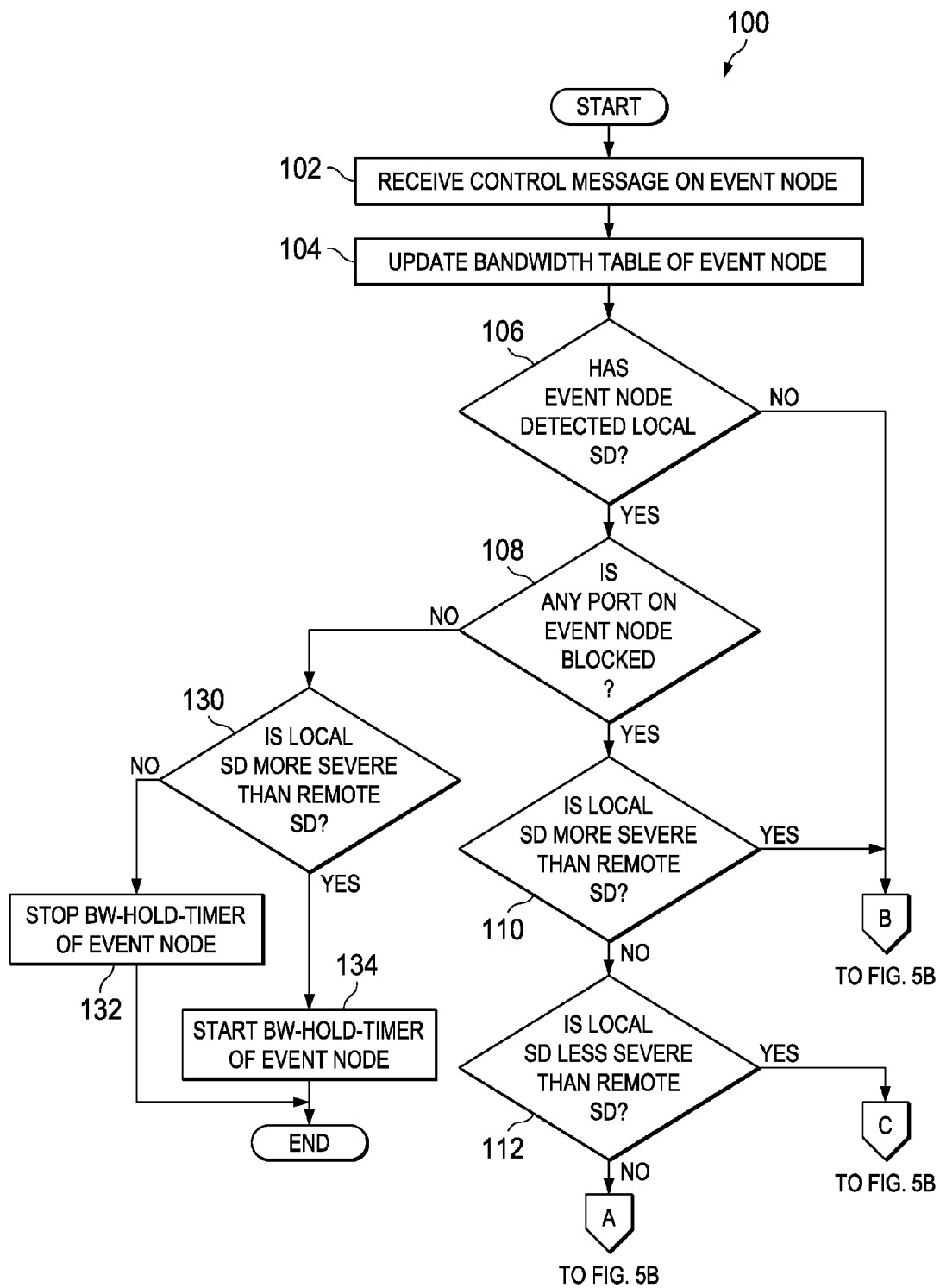
FIGS. 5A-5B are flowcharts illustrating activities associated with receiving a control message in a manual switched state according to at least one embodiment.
Figure 5B:
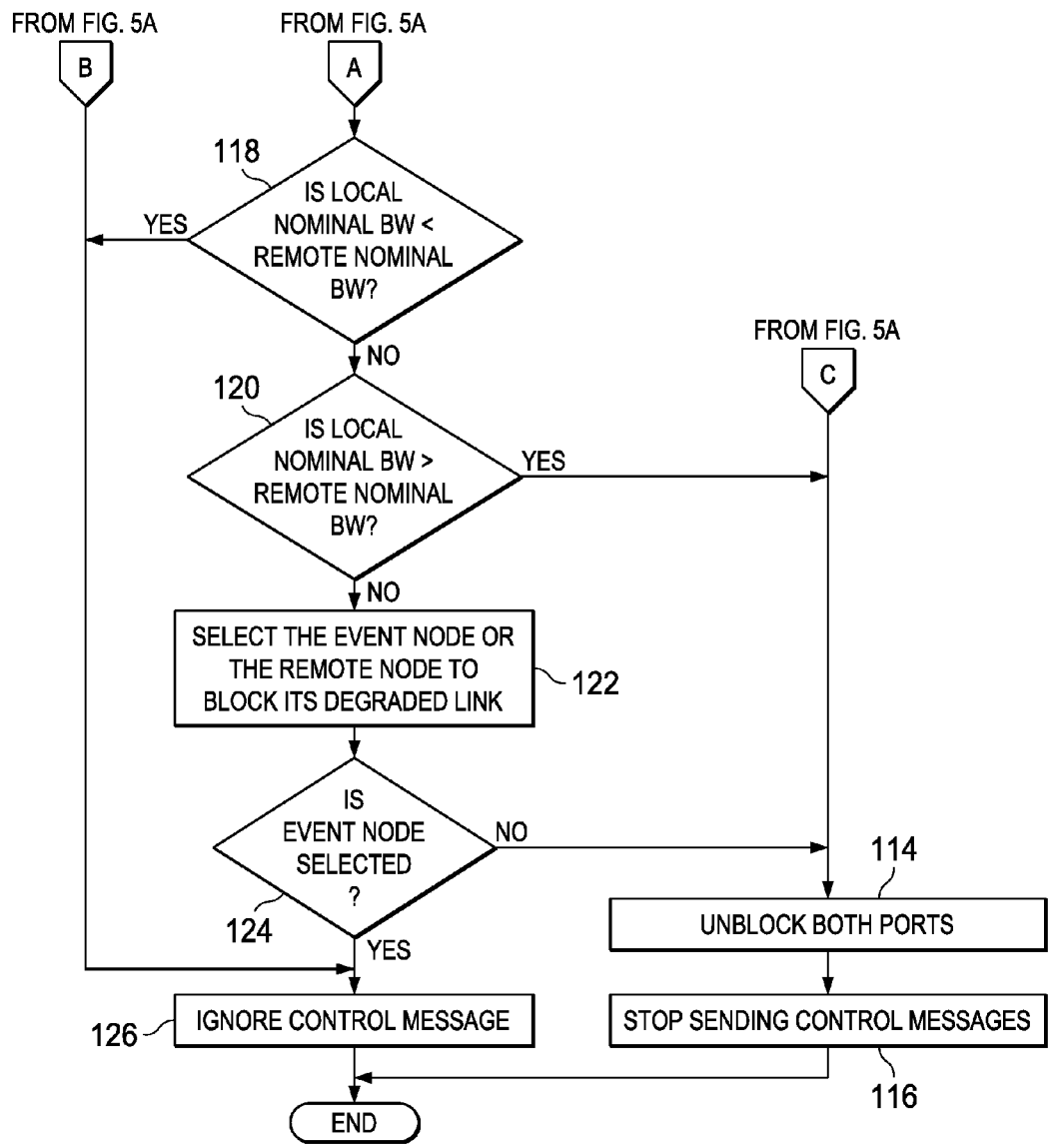

Turning to FIGS. 5A and 5B, an example flowchart illustrates a possible flow 100 of operations that may be associated with embodiments described herein. In at least one embodiment, a set of operations corresponds to activities of FIGS. 5A-5B. Switch 20, or a portion thereof, may utilize the set of operations. Switch 20 may comprise means, such as processor 28, for performing the operations. In an embodiment, one or more operations of flow 100 may be performed by state machine 25. In an embodiment, the operations may be associated with R-APS event 73, occurring on switch 20 when the event node is in a manual switched state. For ease of illustration, FIG. 5 will be explained with continued reference to 'event node,' which may be configured as shown and described with reference to switch 20 of FIG. 2 and configured in a network ring (e.g., G.8032 ring) as shown, for example, in FIG. 1.

At 102, an event node in a network ring receives a control message (e.g., R-APS message with MS and TLV codes) from a remote node in the ring. The received control message indicates that signal degradation (or fading) was detected by the remote node. The remote node could be one hop or multiple hops away from the event node. At 104, the event node updates its bandwidth table with nominal and current bandwidths of the remote node, which may be contained in the TLV fields of the received control message.

At 106, if it is determined that the event node has not previously detected local SD, then the control message can be ignored at 126 and flow can end. The control message can be ignored because the event node does not have any port blocks or local signal degradation, and therefore, does not need to make a determination about which signal degradation is the most severe. Rather, the event node can rely on control messages to indicate which remote node has detected the most severe signal degradation.

If local signal degradation has been detected, however, then at 108, it is determined whether any port of the event node is blocked. If one or more ports are blocked on the event node, then at 110, local signal degradation may be compared to remote signal degradation. The comparison may be based on absolute bandwidth values or on signal degradation percentages to determine whether the bandwidth detected by the (local) event node or the bandwidth detected by the remote node has degraded the most. If local SD is more severe than remote SD, then the received control message can be ignored at 126, and the flow can end. The control message can be ignored because the event node already has a port block and the local signal degradation is more severe.

If local signal degradation is not more severe than remote signal degradation, then at 112, a determination is made as to whether local signal degradation is less severe than remote signal degradation. If local signal degradation is less severe, then the event node can unblock both of its ports at 114 and stop sending control messages at 116. Flow can end because the event node has effectively transferred the port block to the remote node, which has more severe signal degradation.

If the local SD is neither more severe nor less severe than remote SD, then the local and remote signal degradation are equivalent (e.g., as measured by signal degradation percentages), and at 118, local and remote nominal bandwidths can be compared. If local nominal bandwidth is less than remote nominal bandwidth, then the received control message can be ignored at 126, and the flow can end. The control message can be ignored because the event node already has a port block and, although the local and remote signal degradation percentages are equivalent, the nominal bandwidth of the event node has less throughput. Thus, the event node maintains the port block.

If local nominal bandwidth is not less than remote nominal bandwidth, then at 120, a determination is made as to whether local nominal bandwidth is greater than remote nominal bandwidth. If local nominal bandwidth is greater, then the event node can unblock both of its ports at 114 and stop sending control messages at 116. Flow can end because the event node has effectively transferred the port block to the remote node because, although the local and remote signal degradation percentages are equivalent, the nominal bandwidth of the event node has less throughput. Thus, the remote node can maintain the port block.

If the local nominal bandwidth is neither less than nor more than the remote nominal bandwidth, then the local and remote nominal bandwidths are equivalent. In this case, either the event node and the remote node form a node pair connected by the degraded microwave link, or two microwave links in the ring have the exact same degradation severity and nominal bandwidth at the same time. Thus, some selection criteria is used at 122 to select one of the nodes to maintain a port block for its degraded link. As previously described herein, a node identifier is one possible example of selection criteria that may be used.

At 124, if it is determined that the event node was selected, then the received control message can be ignored at 126, and the flow can end. The control message can be ignored because the event node already has a port block and was selected to maintain its port block. However, if it is determined at 124 that the event node was not selected, then the event node can unblock both of its ports at 114 and stop sending control messages at 116. Flow can end because the event node has effectively transferred the port block to the remote node when the remote node was selected to maintain the port block.

With reference again to 106 and 108, if it is determined that the event node previously did detect local SD and that none of the ports on the event node are blocked, then local signal degradation may be compared to remote signal degradation at 130 in FIG. 5B. If local signal degradation is more severe than remote signal degradation, then at 134, the event node can start the BW-Hold-Timer. This can be started to ensure that the local signal degradation detected by the event node is not transient. If the BW-Hold-Timer eventually expires, as opposed to a forced stop, then the event node can block the appropriate one of its ports and send control messages to the other nodes to inform them of the newest most severe degradation. If the BW-Hold-Timer is forced stopped, then a port block in the ring is not transferred to the event node since the signal degradation detected by the event node did not persist for a predetermined period of time.

If it is determined at 130, that local SD in the event node is not more severe than remote SD, then at 132, the event node can stop its BW-Hold-Timer. This can be done because a link in the ring with a more severe signal degradation was detected by a remote node. Flow can end once the BW-Hold-Timer is either stopped at 132 or started at 134.

In another embodiment, further operations may be performed if it is determined that the local SD is not more severe than the remote SD. In particular, if it is determined that the local SD is equivalent to the remote SD (e.g., as measured by signal degradation percentages), then local and remote nominal bandwidths may be compared as described with reference to 118 and 120. If the local nominal bandwidth of the event node is less than the remote nominal bandwidth, then the BW-Hold-Timer of the event node may be started since the local nominal bandwidth has less throughput. Otherwise, the BW-Hold-Timer of the event node may be stopped to allow the remote node to maintain a port block since the degraded link attached to the remote node has less throughput.

Additionally, in this embodiment, if the severity of the signal degradation and the nominal bandwidths are equivalent between the event node and the remote nodes, then some selection criteria may used, for example, as previously described herein, to determine whether to start or stop the BW-Hold-Timer of the event node.

Figure 6A:
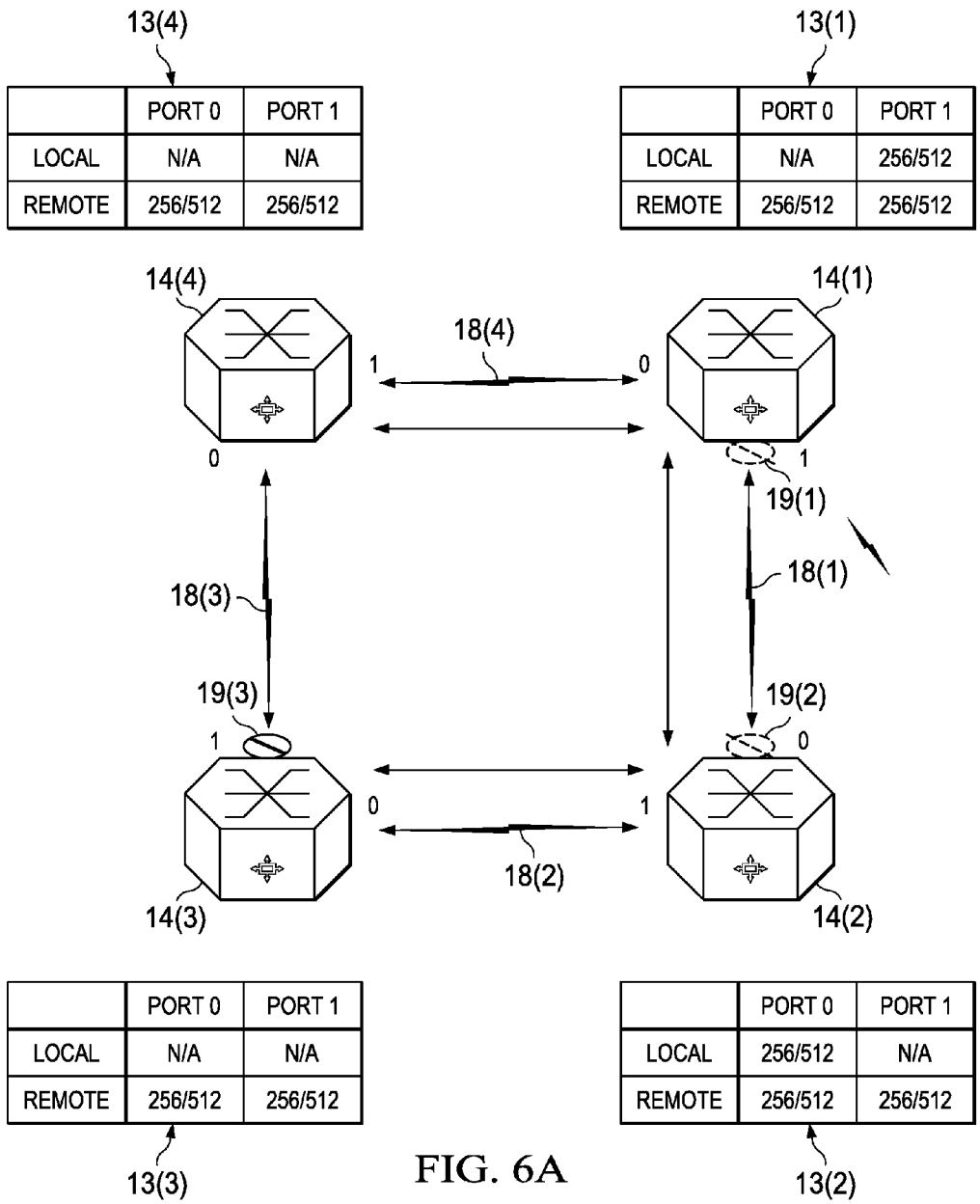
FIG. 6A is a simplified block diagram illustrating an example occurrence of a fading condition in a communication system according to at least one embodiment.
Figure 6B:
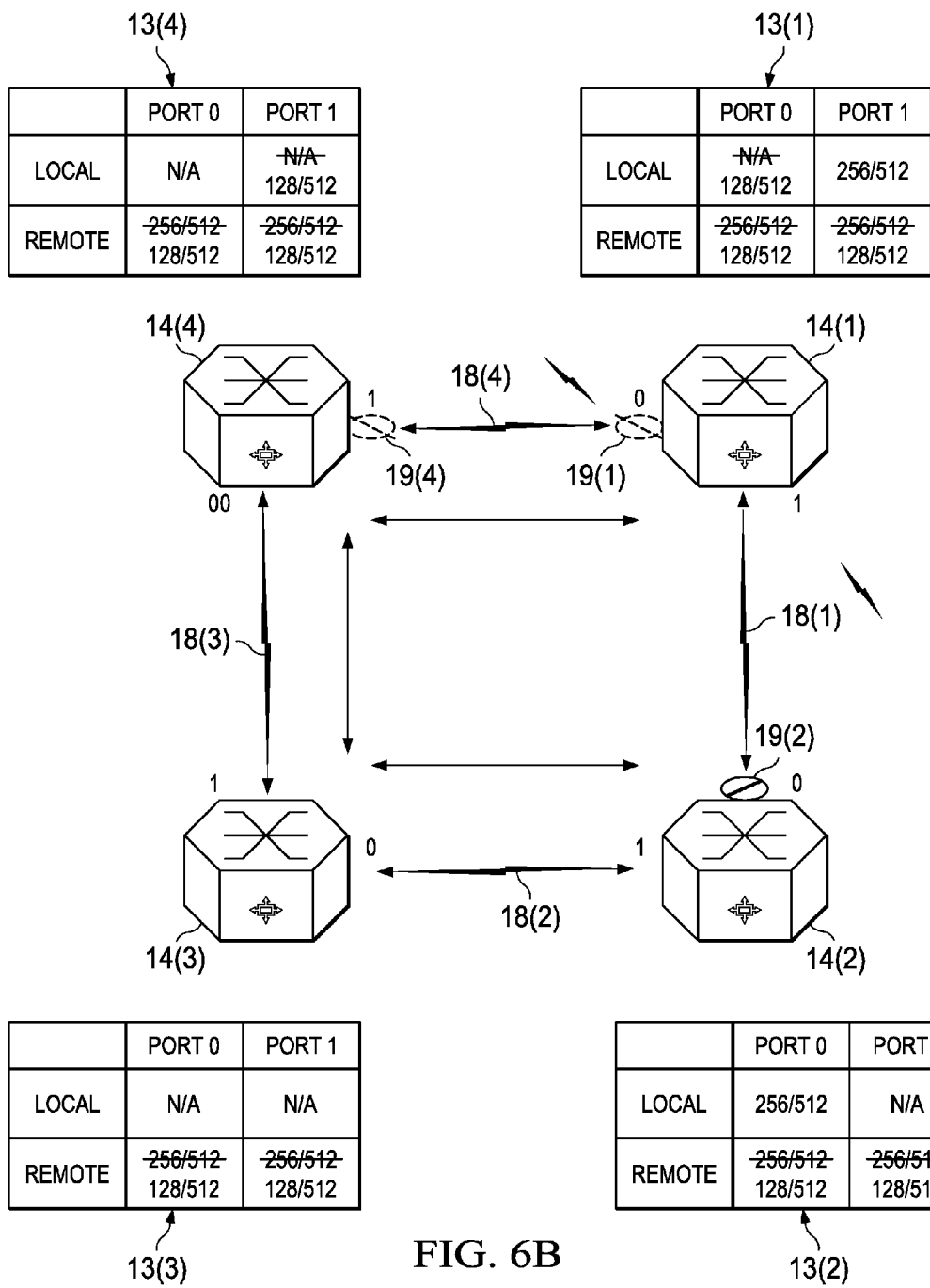
FIG. 6B is a simplified block diagram illustrating an example occurrence of another fading condition in the communication system according to at least one embodiment.

FIGS. 6A and 6B illustrate an example scenario in which fading events occur on multiple microwave links in a G.8032 ring network, and various state machine events occur on nodes in the ring. The G.8032 ring network of communication system 10, shown in FIG. 1, is used to illustrate the example. State machine events are associated with certain logic described herein, for example, with reference to FIGS. 4 and 5. Logic associated with a particular event may be executed when that particular event occurs. In FIGS. 6A and 6B, microwave transceivers 16(1)-16(8) are removed for ease of illustration, but it will be apparent that each microwave link 18(1)-18(4) can be established between a pair of microwave transceivers, such as 16(1)-16(8) of FIG. 1.

According to at least one embodiment, nodes in a G.8032 ring network that are directly connected to at least one microwave link maintain respective bandwidth tables. As shown in FIG. 6A, switches 14(1)-14(4) are each connected to at least one microwave link and each maintain a respective bandwidth table 13(1)-13(4). Bandwidth tables 13(1)-13(4) illustrate possible implementations of bandwidth table 23 shown and described in FIG. 2. A bandwidth table associated with a particular node can contain bandwidth information for adjacent microwave links (i.e., connected to the particular node) that have degraded, and for a remote microwave link that has the most severely degraded bandwidth in the ring. For example, each bandwidth table 13(1)-13(4) stores local current and nominal bandwidths of a microwave link connected to Port 0 of its associated switch, local current and nominal bandwidths of a microwave link connected to Port 1 of its associated switch, and current and nominal bandwidths of a remote microwave link that has the most severely degraded bandwidth in the ring. The current and nominal bandwidths of the most severely degraded remote microwave link are shown in both columns for Port 0 and Port 1. In the example in FIG. 6A, absolute values of the various current and nominal bandwidths are represented in current BW/nominal BW format. In other embodiments, current and nominal bandwidths may alternatively, or additionally, be stored as percentages of signal degradation.

Each one of switches 14(1)-14(4) includes two ports (i.e., 0 and 1) identified by numbers '0' and '1' between each switch and an adjacent microwave link. For example, microwave link 18(1) connects to Port 1 of switch 14(1) and Port 0 of switch 14(2). Microwave link 18(2) connects to Port 1 of switch 14(2) and Port 0 of switch 14(3). Microwave link 18(3) connects to Port 1 of switch 14(3) and Port 0 of switch 14(4). Microwave link 18(4) connects to Port 1 of switch 14(4) and Port 0 of switch 14(1).

In the example scenario shown in FIG. 6A, switch 14(3) has a current port block 19(3) as the RPL owner node. For the sake of illustration and not of limitation, assume the switches are all in idle state 61 and a fading event occurs on microwave link 18(1), causing its bandwidth to degrade by 50%. If microwave link 18(1) has a nominal bandwidth of 512 Mbps, then a signal degradation of 50% results in a bandwidth of 256 Mbps. Accordingly, microwave transceivers connected to endpoints of microwave link 18(1) may report the current and nominal bandwidths (i.e., 256/512 Mbps) to adjacent switches 14(1) and 14(2). In at least one implementation, Y.1731 messages may be used to report the bandwidths. Switch 14(1) can receive the message on Port 1 and switch 14(2) can receive the message on Port 0. Thus, a local SD event 61 can occur on both switch 14(1) and switch 14(2).

For example, local SD event 61 occurs on switch 14(2) when the switch receives (at Port 0) the current and nominal bandwidths of microwave link 18(1) from an adjacent microwave transceiver. A state machine of switch 14(2) may perform operations according to logic associated with local SD event 61, previously described herein. Switch 14(2) can update bandwidth table 13(2) with the received bandwidth information. In particular, a local bandwidth entry for Port 0 in table 13(2) can be updated with the current and nominal bandwidths for link 18(1) (i.e., 256/512 Mbps). A local bandwidth entry for Port 1 in table 13(2) may not be updated at this point, because in this scenario, switch 14(2) has not received any bandwidth information for link 18(2). If Port 0 of switch 14(2) is not blocked, then switch 14(2) applies a port block 19(2). In another scenario, if Port 0 was already blocked, then switch 14(2) could leave the existing port block in place. Switch 14(2) may unblock Port 1, even if Port 1 is not blocked, to ensure that it is capable of receiving and transmitting network flows. Additionally, switch 14(2) transitions from an idle state to a manual switched state when local SD event 61 occurs.

Local SD event 61 may also occur on switch 14(1) when the switch receives (at Port 1) the current and nominal bandwidths of microwave link 18(1) from an adjacent microwave transceiver. A state machine of switch 14(1) may perform operations according to logic associated with local SD event 61, previously described herein. Switch 14(1) can update bandwidth table 13(1) with the received bandwidth information. In particular, a local bandwidth entry for Port 1 in table 13(1) can be updated with the current and nominal bandwidths for link 18(1) (i.e., 256/512 Mbps). A local bandwidth entry for Port 0 in table 13(1) may not be updated at this point, because in this scenario, switch 14(1) has not received any bandwidth information for link 18(4). If Port 1 of switch 14(1) is not blocked, then switch 14(1) applies a port block 19(1). In another scenario, if Port 1 was already blocked, then switch 14(1) could leave the existing port block in place. The non-requested (or opposite) port, Port 0 of switch 14(1), may be unblocked by switch 14(1) to ensure that it is capable of receiving and transmitting network flows. Additionally, switch 14(1) transitions from an idle state to a manual switched state when local SD event 61 occurs.

When switches 14(1) and 14(2) detect the signal degradation on link 18(1), the switches can send control messages to all the other nodes in the ring to inform them of the signal degradation. In at least one embodiment, the control messages may be modified R-APS messages, as illustrated in FIG. 3 and as previously described herein. A control message can contain current and nominal bandwidth information (e.g., 256/512 Mbps) of a degraded microwave link adjacent to the switch that creates and sends the control message.

Each time a node in the ring receives a control message (e.g., from switch 14(1) or from 14(2)), the node can update its own bandwidth table with remote bandwidth information. For example, R-APS event 63 occurs on switch 14(3), when switch 14(3) is in an idle state and receives a control message from switch 14(2). A state machine of switch 14(3) may perform operations according to logic associated with R-APS event 63, previously described herein. Switch 14(3) can extract the current and nominal bandwidths from the control message (i.e., 256/512 Mbps) and update the remote bandwidth entries in bandwidth table 13(3) for Ports 0 and 1. At this point, because switch 14(3) is in the idle state, switch 14(3) removes block 19(3) on Port 1 and may also unblock the opposite port, Port 0. Switch 14(3) also stops sending control messages to other nodes in the ring. Additionally, switch 14(3) transitions from the idle state to a manual switched state when R-APS event 63 occurs.

Next, R-APS event 73 can occur on switch 14(3) when switch 14(3) is in the manual switched state and receives a control message from switch 14(1). The state machine of switch 14(3) may perform operations according to logic associated with R-APS event 73, previously described herein. Switch 14(3) can extract the current and nominal bandwidths from the control message (i.e., 256/512 Mbps) and update the remote bandwidth entries in bandwidth table 13(3) for Ports 0 and 1. In this scenario, the extracted current and nominal bandwidths from the control message should be the same as the current and nominal bandwidths previously stored in the remote entries of bandwidth table 13(3). In addition, switch 14(3) has not previously detected any local signal degradation and, therefore, processing may end once bandwidth table 13(3) is updated. Switch 14(3) remains in the manual switched state when R-APS event 73 occurs. R-APS events 63 and/or 73 may also occur in other nodes (e.g., switch 14(4)) in the ring when the other nodes receive control messages from switches 14(1) and 14(2). If the other nodes have not detected local signal degradation, then operations in those nodes may be similar to operations described with reference to switch 14(3).

In the example scenario of FIG. 6A, when switches 14(2) and 14(1) experience local SD event 61, these switches transition to a manual switched state and each switch may block a respective port connected to degraded link 18(1). When these switches receive control messages from each other, R-APS event 73 occurs in each switch 14(1) and 14(2).

For example, R-APS event 73 occurs on switch 14(2) when it receives a control message from switch 14(1). A state machine of switch 14(2) may perform operations according to logic associated with R-APS event 73, previously described herein. After receiving the control message, switch 14(2) may update the remote entries in its bandwidth table 13(2) with current and nominal bandwidths contained in the control message. Switch 14(2) may also determine whether it has a blocked port. In this scenario, Port 0 is blocked at 19(2) and a local signal degradation was previously detected. Therefore, switch 14(2) determines whether its local current bandwidth has degraded more than the most severely degraded remote current bandwidth. In some embodiments, the determination may be made by comparing absolute bandwidth values (e.g., Is local BW value<remote BW value?). The local BW value can be obtained from the local current bandwidth entry for Port 0 in table 13(2), and the remote BW value can be the current bandwidth provided in the received control message and stored in remote entries of table 13(2). In other embodiments, the determination may be made by comparing signal degradation percentages (e.g., Is local SD %>remote SD %?). The local SD % can be calculated using local current and nominal bandwidth entries for Port 0 in bandwidth table 13(2). The remote SD % can be calculated using current and nominal bandwidths provided in the received control message and stored in remote entries of table 13(2). In this example case, the local and remote current bandwidths have experienced the same amount of degradation both when comparing absolute values (i.e., 256 Mbps) and when comparing signal degradation percentages (i.e., 50%).

If current bandwidths are compared based on signal degradation percentages, then, if the current bandwidth degradation percentages are equivalent (e.g., both are 50%), then switch 14(2) may compare its local nominal bandwidth for Port 0 stored in table 13(2) to the remote nominal bandwidth received in the control message. This accommodates a situation in which multiple microwave links have the same percentage of signal degradation, but one link has a higher nominal bandwidth. Thus, the link with the lower nominal bandwidth and, therefore, the lower throughput, may be protected. In this case, however, the nominal bandwidths are the same (i.e., 512 Mbps) because the signal degradation was detected on the same link 18(1) by different nodes.

In this scenario, where the local signal degradation percentage at switch 14(2) is equivalent to the remote signal degradation percentage at switch 14(1), and the local nominal bandwidth value at switch 14(2) is equivalent to the remote nominal bandwidth value at switch 14(1), then some other criteria is used to select one of the switches 14(1) or 14(2) as the blocking node. This can occur when signal degradation is detected by both switches in a switch pair connected by a degraded microwave link (e.g., 18(1)), or when the same signal degradation occurs at the same time on separate links having the same nominal bandwidth. In at least one embodiment, the selection criteria can be based on a node identifier. For example, the node with a higher node identifier may be selected as the blocking node. In this embodiment, if a node identifier of switch 14(2) is determined to be higher than a node identifier of switch 14(1), then switch 14(2) retains port block 19(2) and ignores the control message from switch 14(1). However, if the node identifier of switch 14(2) is not higher than the node identifier of switch 14(1), then switch 14(2) unblocks both of its ports and ceases transmitting control messages reporting the signal degradation of link 18(1). It will be apparent that any other suitable selection criteria may be used in this instance. For example, in another embodiment, the node with a lower node identifier may be selected as the blocking node.

R-APS event 73 may also occur on switch 14(1) when it receives a control message from switch 14(2). Switch 14(1) may go through similar processing as previously described with reference to switch 14(2). Switch 14(1) can update remote entries in its bandwidth table 13(1), determine that the local and remote signal degradation percentages are equivalent, and determine that the local and remote nominal bandwidth values are equivalent. Thus, switch 14(1) may also use some selection criteria to determine whether to retain or remove its block 19(1) at Port 1, so that only one of the switches 14(1) and 14(2) maintains a port block adjacent to degraded microwave link 18(1).

FIG. 6B is another diagram of the G.8032 ring network of FIG. 6A illustrating an additional fading event and resulting state machine events in the nodes. Assume for the sake of illustration and not of limitation, that each of the nodes in the ring is in a manual switched state as a result of activities described with reference to FIG. 6A, and that each bandwidth table 13(1)-13(4) shown in FIG. 6B is initially configured with the entries shown in FIG. 6A. At least some of these entries are updated as described with reference to activities occurring in FIG. 6B. Therefore, for ease of explanation, initial entries in bandwidth tables 13(1)-13(4) that are subsequently updated are crossed through, and the resulting new entries are not crossed through. Additionally, assume switch 14(2) has a greater node identifier than switch 14(1) and, therefore, was selected to maintain port block 19(2) at Port 0 in order to protect degraded microwave link 18(1).

In FIG. 6B, a fading event occurs on microwave link 18(4) after the fading event on microwave link 18(1). Assume for the sake of illustration that the bandwidth of microwave link 18(4) degrades by 75%. If microwave link 18(4) has a nominal bandwidth of 512 Mbps, then a 75% signal degradation results in a bandwidth of 128 Mbps. Accordingly, microwave transceivers connected to endpoints of microwave link 18(4) may report the current and nominal bandwidths (i.e., 128/512 Mbps) to adjacent switches 14(1) and 14(4). In at least one implementation, Y.1731 messages may be used to report the bandwidths. Switch 14(1) can receive the message on Port 0 and switch 14(4) can receive the message on Port 1. Thus, local SD event 71 can occur on switch 14(1) and on switch 14(4).

For example, local SD event 71 occurs on switch 14(1) when the switch receives (at Port 0) the current and nominal bandwidths of microwave link 18(4) from an adjacent microwave transceiver. A state machine of switch 14(1) may perform operations according to logic associated with local SD event 71, previously described herein. Switch 14(1) can update bandwidth table 13(1) with the received bandwidth information. In particular, a local bandwidth entry for Port 0 in table 13(1) can be updated with the current and nominal bandwidths for link 18(4) (i.e., 128/512 Mbps). A local bandwidth entry for Port 1 in table 13(1) already contains current and nominal bandwidth information (i.e., 256/512 Mbps) for degraded microwave link 18(1). In this case, the requested port (Port 0 of switch 14(1)) is not blocked, so switch 14(1) determines whether the local current bandwidth associated with Port 0 has degraded more than the most severely degraded remote current bandwidth. In some embodiments, the determination may be made by comparing absolute bandwidth values (e.g., Is local BW<remote BW?). The local BW value can be the current bandwidth provided by the microwave transceiver for link 18(4) and stored in table 13(1). The remote BW value can be obtained from remote entries in bandwidth table 13(1). In this example, the local current bandwidth (i.e., 128 Mbps) is more severely degraded than the remote current bandwidth (i.e., 256 Mbps) when comparing absolute bandwidths.

In other embodiments, determining the most severely degraded link may be done by comparing signal degradation percentages (e.g., Is local SD %>remote SD %?). The local SD % can be calculated using current and nominal bandwidth values provided by the microwave transceiver for link 18(4) and stored in table 13(1). The remote SD % can be calculated using remote bandwidth entries in bandwidth table 13(1). In this example, the local current bandwidth (i.e., 75% degraded) is more severely degraded than the remote current bandwidth (i.e., 50% degraded). Because the local SD % is greater than the remote SD %, a BW-Hold-Timer for switch 14(1) can be started. Once the BW-Hold-Timer is started, switch 14(1) essentially waits until the BW-Hold-Timer expires before sending out control messages to report the fading condition on link 18(4). Hence, the BW-Hold-Timer minimizes switching port blocks during a transient fading event. Additionally, switch 14(1) remains in the manual switched state when local SD event 71 occurs.

Local SD event 71 may also occur on switch 14(4) when the switch receives (at Port 1) the current and nominal bandwidths of microwave link 18(4) from an adjacent microwave transceiver. A state machine of switch 14(4) may perform operations according to logic associated with local SD event 71, previously described herein. Switch 14(4) can update bandwidth table 13(4) with the received bandwidth information. In particular, a local bandwidth entry for Port 1 in table 13(4) can be updated with the current and nominal bandwidths for link 18(4) (i.e., 128/512 Mbps). A local bandwidth entry for Port 0 in table 13(4) may not be updated at this point, because in this scenario, switch 14(4) has not received any bandwidth information for link 18(3). In this case, the requested port (Port 1 of switch 14(4)) is not blocked, so switch 14(4) determines whether the local current bandwidth associated with Port 1 has degraded more than the most severely degraded remote current bandwidth. As previously described, this determination may be made by comparing absolute bandwidth values or signal degradation percentages. In this example, the local current bandwidth (i.e., 128 Mbps, 75% degraded) is more severely degraded than the remote current bandwidth (i.e., 256 Mbps, 50% degraded) when comparing either absolute bandwidths or signal degradation percentages. Because the local SD % is greater than the remote SD %, a BW-Hold-Timer for switch 14(4) can be started. Additionally, switch 14(4) remains in the manual switched state when local SD event 71 occurs.

Other events could potentially supersede the fading event on link 18(4) and in these cases, the BW-Hold-Timers for switches 14(1) and 14(4) may be forced stopped. For example, another fading event could occur on a different link (e.g., link 18(1), 18(2), or 18(3)) that results in more severe fading. In this instance, the BW-Hold-Timers of switches 14(1) and 14(4) can be stopped and other BW-Hold-Timers of the nodes attached to the more severely degraded microwave link may be started. In another example, if the signal degradation of link 18(4) was, in fact, transient, then an additional local SD event (or a local CLEAR SD event) may occur in which the updated local current and nominal bandwidths of link 18(4) are provided to switches 14(1) and 14(4) by adjacent microwave transceivers. If the bandwidth of link 18(4) is back to normal, or at least less severely degraded than the bandwidth of another degraded link in the ring, then the BW-Hold-Timers may be stopped by switches 14(1) and 14(4).

If no other events supersede the BW-Hold-Timers of switches 14(1) and 14(2), however, then eventually the timers will expire, resulting in BW-Hold-Timer expiration events 72 on each switch. Respective state machines of switches 14(1) and 14(4) may perform operations according to logic associated with BW-Hold-Timer expiration event 72, previously described herein. For example, when the BW-Hold-Timer of switch 14(1) expires, then switch 14(1) may update bandwidth table 13(1) with bandwidth information. In at least one example, an updated current bandwidth of link 18(4) may be obtained to update table 13(1). Switch 14(1) also blocks Port 0 at 19(1). The opposite port, Port 1 of switch 14(1) in this scenario, may be unblocked to ensure that it is capable of receiving and transmitting network flows. Switch 14(1) also sends control messages to all the other nodes in the ring to inform them of the signal degradation. A control message in this scenario can contain local current and nominal bandwidth information (i.e., 128/512 Mbps) of degraded link 18(4). Also, switch 14(1) remains in the manual switched state when BW-Hold-Timer expiration event 72 occurs.

Similarly, when the BW-Hold-Timer of switch 14(4) expires, then switch 14(4) may update bandwidth table 13(4) with bandwidth information. In at least one example, an updated current bandwidth of link 18(4) may be obtained to update table 13(4). Switch 14(4) also blocks Port 1 at 19(4). The opposite port, Port 0 of switch 14(1) in this scenario, may be unblocked to ensure that it is capable of receiving and transmitting network flows. Switch 14(4) also sends control messages to all the other nodes in the ring to inform them of the signal degradation. The control messages in this scenario can contain local current and nominal bandwidth information (i.e., 128/512 Mbps) of degraded link 18(4). Also, switch 14(4) remains in the manual switched state when BW-Hold-Timer expiration event 72 occurs.

Each time a node in the ring, currently in the manual switched state, receives a control message (e.g., from switch 14(1) or from switch 14(4)), R-APS event 73 may occur in that node. A state machine of the respective node may perform operations according to logic associated with R-APS event 73, previously described herein. For nodes that do not have local signal degradation, the node can simply update its own bandwidth table with remote bandwidth information from the received control message. By way of example, assume switch 14(3) receives a control message from switch 14(4) before receiving a control message from switch 14(1). When switch 14(3) receives the control message from switch 14(4), switch 14(3) can extract the current and nominal bandwidths from the control message (i.e., 128/512 Mbps) and replace remote bandwidth entries for Ports 0 and 1 in bandwidth table 13(3) with the new values. Thus, 256/512 Mbps is replaced with 128/512 Mbps in bandwidth table 13(3) in the remote entries. Switch 14(3) can remain in the manual switched state in response to R-APS event 73. If switch 14(3) subsequently receives a control message from switch 14(1), then switch 14(3) can process the new control message in the same manner. Eventually, switches 14(1) and 14(4) can determine between them which one will maintain a port block for degraded link 18(4). Once this is determined, only the node with the port block will send control messages, until another fading event, signal restoration, signal failure, or forced switch occurs somewhere in the ring. The activities occurring in switch 14(3) in the manual switched state may also be performed in other nodes in the ring, if any, that have not detected a local signal degradation, and that receive control messages from switch 14(1) and/or switch 14(4).

When switch 14(2) receives a control message from switch 14(1) or 14(4), switch 14(2) can extract the current and nominal bandwidths from the control message (i.e., 128/512 Mbps) and replace 256/512 Mbps with 128/512 Mbps in the remote bandwidth entries in bandwidth table 13(2) for Ports 0 and 1. Because switch 14(2) has a blocked port at 19(2), switch 14(2) compares its local current bandwidth stored in table 13(2) to the remote current bandwidth received in the control message. In some embodiments, the comparison may be made between absolute bandwidth values. In other embodiments, the comparison may be made between signal degradation percentages. In this case, the local current bandwidth (i.e., 256 Mbps) of switch 14(2) is greater than the remote current bandwidth (i.e., 128 Mbps) reported in the control message. In addition, the local signal degradation percentage (i.e., 50%) is less than the remote signal degradation percentage (i.e., 75%). Therefore, switch 14(2) unblocks both of its ports and stops transmitting control messages that report the signal degradation of link 18(1). Switch 14(2) can remain in the manual switched state in response to this event.

When switches 14(1) and 14(4) receive control messages from each other, based on the signal degradation of link

18(4), R-APS event 73 can occur in each switch. Respective state machines in switches 14(1) and 14(4) may perform operations according to logic associated with R-APS event 73, as previously described herein. The operations performed in switches 14(1) and 14(4) may be similar to the operations performed in switches 14(1) and 14(4) when they received control messages from each other based on the signal degradation on microwave link 18(1). Accordingly, in this scenario, the local and remote current bandwidths are the same for both switches 14(1) and 14(4) when comparing absolute values (i.e., 128 Mbps) and when comparing signal degradation percentages (i.e., 75%), because signal degradation is being compared for the same link 18(4). The nominal bandwidths are also the same (i.e., 512 Mbps).

Because switches 14(1) and 14(4) detected signal degradation on the same link 18(4), another selection criteria (e.g., node identifier) is used to select one of the switches 14(1) or 14(4) as the blocking node, as previously described herein. For example, the node with a higher node identifier may be selected as the blocking node. In this embodiment, if a node identifier of switch 14(4) is determined to be higher than a node identifier of switch 14(1), then switch 14(4) retains port block 19(4) and ignores the control message from switch 14(1). However, if the node identifier of switch 14(4) is not higher than the node identifier of switch 14(1), then switch 14(4) unblocks both of its ports and ceases transmitting control messages reporting the signal degradation of link 18(4). The switch that is selected can maintain its port block connected at the port connected to degraded link 18(4), and other nodes in the ring can learn which switch has a port block from subsequent control messages. Thus, all of the other nodes in the ring are informed of the signal degradation of link 18(4) and which node has a port block to link 18(4). Therefore, the other nodes can intelligently route network flows away from link 18(4), which has the most severe degradation in this example case.

In at least one embodiment, communication system 10 accommodates switching a port block to a second worst node, etc., when a previous worst node has recovered enough to no longer be the most severely degraded node. For ease of illustration, the 'worst node' is intended to mean the node in a network ring that is connected to a link having the most severe bandwidth degradation, the 'second worst node' is intended to mean the node that is connected to a link having the second worst bandwidth degradation in the ring, etc.

In a first example illustration, assume Node A was previously identified as the worst node in network ring and a port block was applied on one of its ports, but now Node A is partially recovered, making node B the worst node in the ring. The following table illustrates the states, events, and actions as they can occur, sequentially, for nodes A and B in this scenario:

| | Beginning State/ Ending State | Event | Action |
| --- | --- | --- | --- |
| Node A (current worst-recovering) | Manual Switched 55/ Manual Switched 55 | Local SD 71 | Update bandwidth table and transmit R-APS with updated bandwidth information (e.g., increased local current bandwidth indicating recovery of the link) |
| Node B (new worst) | Manual Switched 55/ Manual Switched 55 | R-APS 73 | After updating bandwidth table with remote current bandwidth from R-APS message, node B becomes the worst node (e.g., Local SD % > Remote SD % or Local BW < Remote BW), and starts the BW-Hold-Timer |
| Node B (new worst) | Manual Switched 55/ Manual Switched 55 | BW-Hold-Timer Expiration 72 | Node B blocks its degraded link and transmits R-APS with current and nominal bandwidths of the degraded link |
| Node A (previous worst) | Manual Switched 55/ Manual Switched 55 | R-APS 73 | Since Node A is no longer the worst node, it unblocks its port and stops transmitting R-APS messages. |

In a second example illustration, assume Node A was previously identified as the worst node in a network ring and a port block was applied on one of its ports, but now Node A is fully recovered, making node B the worst node in the ring. The following table illustrates the states, events, and actions as they can occur, sequentially, for nodes A, B, and other nodes in the ring in this scenario:

| | Beginning State/ Ending State | Event | Action |
| --- | --- | --- | --- |
| Node A (current worst-recovered) | Manual Switched 55/ Pending 53 | Local CLEAR SD 41 | Transmit R-APS (NR). Transition to Pending State. |
| All Other Nodes | Manual Switched 55/ Pending 53 | R-APS 43 | Transition all other Nodes to Pending State. Evaluate local SD and start BW-Hold-Timer. This starts the election process again in remaining nodes connected to degraded links. |

In a third example illustration, assume Node A was previously identified as the worst node in network ring and a port block was applied on one of its ports, but now Node B is severely degraded, making node B the worst node in the ring. The following table illustrates the states, events, and actions as they can occur, sequentially, for nodes A and B in this scenario:

|  | Beginning State/ Ending State | Event | Action |
|---|---|---|---|
| Node B (new worst) | Manual Switched 55/ Manual Switched 55 | Local SD 71 | Node B becomes the new worst node because the bandwidth of an adjacent link is received and is more severely degraded than the bandwidth of Node A (e.g., Local SD % > Remote SD % or Local BW < Remote BW), and starts BW-Hold-Timer. |
| Node B (new worst) | Manual Switched 55/ Manual Switched 55 | BW-Hold-Timer Expiration 72 | Node B blocks its degraded link and transmits R-APS with current and nominal bandwidths of the degraded link |
| Node A (previous worst) | Manual Switched 55/ Manual Switched 55 | R-APS 73 | Since Node A is no longer the worst node, it unblocks its port and stops transmitting R-APS messages. |

In example implementations, at least some portions of the activities outlined herein may be implemented in software in, for example, switches 14(1)-14(4) and switch 20. In some embodiments, one or more of these features may be implemented in hardware, firmware, provided external to these elements, or consolidated in any appropriate manner to achieve the intended functionality. The various network elements (e.g., switches 14(1)-14(4), switch 20) may include software (or reciprocating software) that can coordinate in order to achieve the operations as outlined herein. In still other embodiments, these elements may include any suitable algorithms, hardware, firmware, software, components, modules, interfaces, or objects that facilitate the operations thereof.

Furthermore, switches 14(1)-14(4) described and shown herein (and/or their associated structures) may also include suitable interfaces for receiving, transmitting, and/or otherwise communicating data or information in a network environment and particularly, in a G.8032 network ring. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 29) can store data used for the operations described herein. This includes the memory element being able to store instructions (e.g., software, logic, code, etc.) in non-transitory computer readable media, such that the instructions are executed to carry out the activities described in this Specification. A processor can execute any type of instructions associated with the data to achieve the operations detailed herein in this Specification. In one example, processors (e.g., processor 28) could transform an element or an article (e.g., data) from one state or thing to another state or thing.

In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of computer readable storage medium (e.g., random access memory (RAM), read only memory (ROM), field programmable gate array (FPGA), erasable programmable read only memory (EPROM), electrically erasable programmable ROM (EEPROM), etc.), software, hardware, firmware, or in any other suitable component, device, element, or object where appropriate and based on particular needs. In at least some instances, the media may be non-transitory. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these operations may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   blocking, on a first node, a port adjacent to a first link in a network ring based on detecting a first current bandwidth of the first link and using a nominal bandwidth of the first link to determine a first signal degradation associated with the first link;
   receiving a control message from a second node in the network ring, the control message including (i) a first field including a second current bandwidth of a second link, and (ii) a second field including a nominal bandwidth of the second link;
   updating a bandwidth table associated with the first node using the nominal bandwidth of the second link and the second current bandwidth received in the control message;
   determining a second signal degradation associated with the second link based on the second current bandwidth and the nominal bandwidth of the second link;
   determining whether the second signal degradation is more severe than the first signal degradation; and
   unblocking the port adjacent to the first link on the first node based on determining the second signal degradation is more severe than the first signal degradation.

2. The method of claim 1, further comprising:
   unblocking a second port on the first node based on determining the second signal degradation is more severe than the first signal degradation.

3. The method of claim 1, wherein the first field and the second field of the control message are type-length-value (TLV) fields.

4. The method of claim 1, further comprising:
   upon determining that the second signal degradation is more severe than the first signal degradation, stop transmitting control messages from the first node.

5. The method of claim 1, further comprising:
   updating the bandwidth table using the first current bandwidth received from an adjacent microwave transceiver.

6. The method of claim 1, wherein the determining whether the second signal degradation is more severe than the first signal degradation includes obtaining at least one of the first current bandwidth or the second current bandwidth from the bandwidth table associated with the first node.

7. The method of claim 1, wherein the determining whether the second signal degradation is more severe than the first signal degradation includes comparing an absolute value of the first current bandwidth with an absolute value of the second current bandwidth.

8. The method of claim 1, wherein the determining whether the second signal degradation is more severe than the first signal degradation comprises:
   calculating a first signal degradation percentage of the first link;
   calculating a second signal degradation percentage of the second link; and
   comparing the first and second signal degradation percentages.

9. The method of claim 1, further comprising:
   comparing the nominal bandwidth of the first link with the nominal bandwidth of the second link upon determining that the second signal degradation is equivalent to the first signal degradation; and
   unblocking the port adjacent to the first link on the first node based on the comparing indicating the nominal bandwidth of the first link is greater than the nominal bandwidth of the second link.

10. The method of claim 1, wherein one or more virtual local area networks (VLANs) on the port are blocked if the port on the first node is blocked.

11. The method of claim 1, wherein the determining whether the second signal degradation is more severe than the first signal degradation is performed, at least in part, by a state machine on the first node.

12. An apparatus in a network ring, comprising:
    at least one memory element including instructions; and
    at least one processor coupled to the memory element and when executing the instructions, the at least one processor is to:
    block, on a first node, a port adjacent to a first link in a network ring based on detecting a first current bandwidth of the first link and using a nominal bandwidth of the first link to determine a first signal degradation associated with the first link;
    receive a control message from a second node in the network ring, the control message including (i) a first field including a second current bandwidth of a second link, and (ii) a second field including a nominal bandwidth of the second link;
    update a bandwidth table associated with the first node using the nominal bandwidth of the second link and the second current bandwidth received in the control message;
    determine a second signal degradation associated with the second link based on the second current bandwidth and the nominal bandwidth of the second link;
    determine whether the second signal degradation is more severe than the first signal degradation; and
    unblock the port adjacent to the first link on the first node based on determining the second signal degradation is more severe than the first signal degradation.

13. The apparatus of claim 12, wherein when executing the instructions, the at least one processor is to:
    unblock a second port on the first node based on determining the second signal degradation is more severe than the first signal degradation.

14. The apparatus of claim 12, wherein when executing the instructions, the at least one processor is to:
    stop transmitting control messages from the first node upon determining that the second signal degradation is more severe than the first signal degradation.

15. The apparatus of claim 12, wherein determining whether the second signal degradation is more severe than the first signal degradation includes obtaining at least one of the first current bandwidth and the second current bandwidth from the bandwidth table associated with the first node.

16. A non-transitory, machine-readable storage medium comprising code that when executed by at least one processor is to:
    block, on a first node, a port adjacent to a first link in a network ring based on detecting a first current bandwidth of the first link and using a nominal bandwidth of the first link to determine a first signal degradation associated with the first link;
    receive a control message from a second node in the network ring, the control message including (i) a first field including a second current bandwidth of a second link, and (ii) a second field including a nominal bandwidth of the second link;
    update a bandwidth table associated with the first node using the nominal bandwidth of the second link and the second current bandwidth received in the control message;
    determine a second signal degradation associated with the second link based on the second current bandwidth and the nominal bandwidth of the second link;
    determine whether the second signal degradation is more severe than the first signal degradation; and
    unblock the port adjacent to the first link on the first node based on determining the second signal degradation is more severe than the first signal degradation.

17. The non-transitory, machine-readable storage medium of claim 16, wherein the code, when executed by at least one processor, is to:
    unblock a second port on the first node based on determining the second signal degradation is more severe than the first signal degradation.

18. The non-transitory, machine-readable storage medium of claim 16, wherein the determining whether the second signal degradation is more severe than the first signal degradation includes comparing an absolute value of the first current bandwidth with an absolute value of the second current bandwidth.

19. The non-transitory, machine-readable storage medium of claim 16, wherein the code, when executed by at least one processor, is to:
    calculate a first signal degradation percentage of the first link;
    calculate a second signal degradation percentage of the second link; and
    compare the first and second signal degradation percentages.

20. The non-transitory, machine-readable storage medium of claim 16, wherein the code, when executed by at least one processor, is to:
    compare the nominal bandwidth of the first link with the nominal bandwidth of the second link upon determining that the second signal degradation is equivalent to the first signal degradation; and
    unblock the port adjacent to the first link on the first node based on the comparing indicating the nominal bandwidth of the first link is greater than the nominal bandwidth of the second link.

* * * * *